(12) United States Patent
Matsubara et al.

(10) Patent No.: US 8,271,178 B2
(45) Date of Patent: Sep. 18, 2012

(54) CONTROL APPARATUS FOR VEHICULAR POWER TRANSMITTING SYSTEM

(75) Inventors: Tooru Matsubara, Toyota (JP); Atsushi Tabata, Okazaki (JP); Masakazu Kaifuku, Okazaki (JP); Hidenori Kato, Chiryu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1148 days.

(21) Appl. No.: 12/153,981

(22) Filed: May 28, 2008

(65) Prior Publication Data
US 2008/0300761 A1 Dec. 4, 2008

(30) Foreign Application Priority Data

May 29, 2007 (JP) .................................. 2007-142493

(51) Int. Cl.
*G05D 1/00* (2006.01)
(52) U.S. Cl. .................. 701/79; 477/5; 477/37; 477/51; 477/110; 701/51
(58) Field of Classification Search ................ 477/5, 37, 477/51, 110; 701/51
See application file for complete search history.

(56) References Cited

U.S. PATENT DOCUMENTS

| | | | | |
|---|---|---|---|---|
| 2007/0111854 | A1* | 5/2007 | Tabata et al. | 477/110 |
| 2008/0076623 | A1* | 3/2008 | Tabata et al. | 477/5 |
| 2008/0269010 | A1* | 10/2008 | Matsubara et al. | 477/5 |
| 2008/0269996 | A1* | 10/2008 | Imamura et al. | 701/51 |
| 2008/0293539 | A1* | 11/2008 | Matsubara et al. | 477/37 |

FOREIGN PATENT DOCUMENTS

| | | |
|---|---|---|
| JP | A-6-276611 | 9/1994 |
| JP | A-2005-264762 | 9/2005 |
| JP | A-2007-125920 | 5/2007 |

OTHER PUBLICATIONS

Office Action for corresponding Japanese Patent Application No. 2007-142493, mailed on Nov. 24, 2010 (w/ partial English translation).

* cited by examiner

*Primary Examiner* — James Trammell
*Assistant Examiner* — Sanjeev Malhotra
(74) *Attorney, Agent, or Firm* — Oliff & Berridge, PLC

(57) ABSTRACT

A control apparatus for a vehicular power transmitting system including (a) an electrically controlled differential portion which has a differential mechanism and a first electric motor connected to a rotary element of the differential mechanism and which is operable to control a differential state between a rotating speed of its input shaft connected to a drive power source and a rotating speed of its output shaft by controlling an operating state of the first electric motor, and (b) a switching portion operable to switch a power transmitting path for transmitting power from the drive power source, between a power transmitting state and a power cut-off state, the control apparatus including a control range setting portion configured to set one of two different control ranges of a rotating speed of the output shaft, depending upon whether the power transmitting path is placed in the power transmitting state or said power cut-off state, by the switching portion.

26 Claims, 10 Drawing Sheets

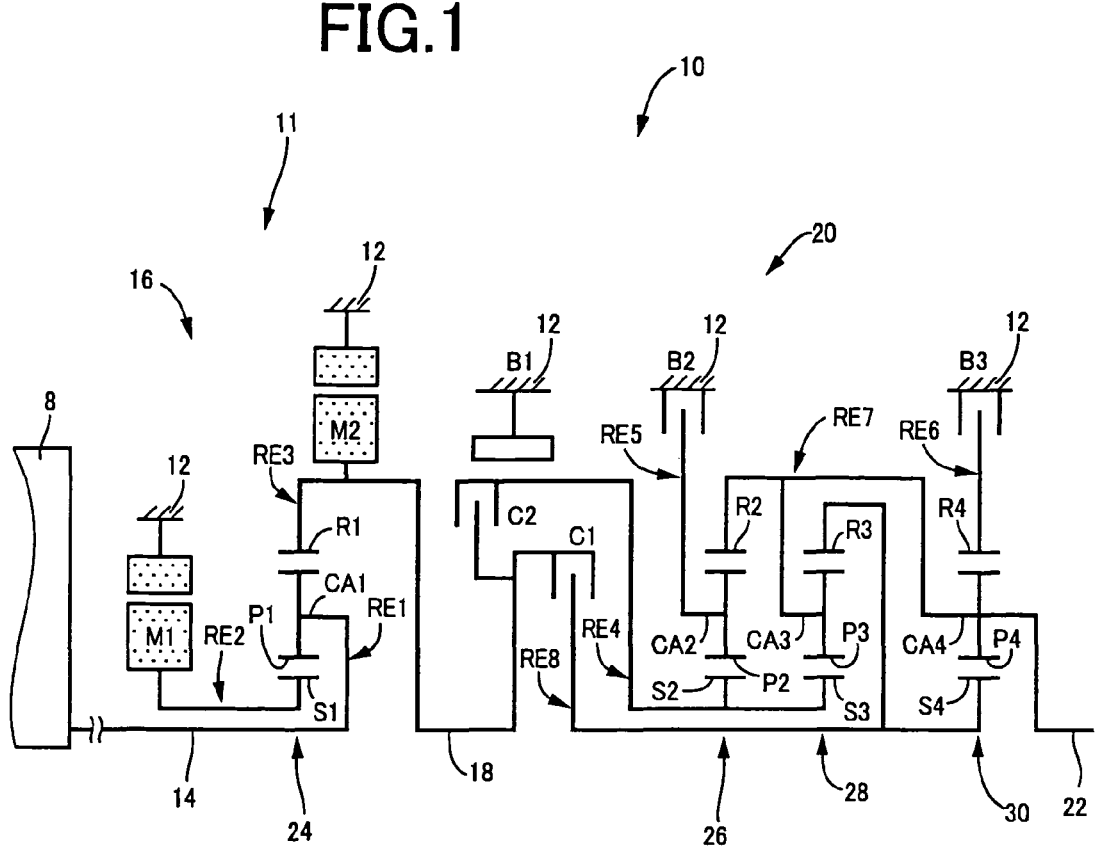

|  | VEHICLE SPEED (km/h) | | |
|---|---|---|---|
|  | -50 | -20 | 0 ≦ |
| ENGINE SPEED ERROR FROM TARGET VALUE -1000 | -1500 | -1000 | 10000 |
| -500 | -1200 | -700 | 10000 |
| 0 | -1000 | -500 | 10000 |
| 500 | -1000 | -500 | 10000 |
| 1000 | -1000 | -500 | 10000 |

CONTROL APPARATUS FOR VEHICULAR POWER TRANSMITTING SYSTEM

CROSS REFERENCE TO RELATED APPLICATION

The present application claims priority from Japanese Patent Application No. 2007-142493, which was filed on May 29, 2007, the disclosure of which is herein incorporated by reference in its entirety.

BACKGROUND OF THE INVENTION

1. Field of the Invention

The present invention relates in general to a control apparatus for a vehicular power transmitting system, and more particularly to a control apparatus for a vehicular power transmitting system including an electrically controlled differential portion which includes an electric motor and an operating speed of which is controlled by the electric motor, and a switching portion which constitutes a part of a power transmitting path between the electrically controlled differential portion and a drive wheel of a vehicle and which is operable to switch the power transmitting path between a power transmitting state and a power cut-off state.

2. Discussion of Prior Art

There is known a vehicular drive system including (a) a drive power source in the form of an engine, (b) an electrically controlled differential portion which has a differential mechanism and a first electric motor connected to a rotary element of the differential mechanism and which is operable to control a differential state between rotating speeds of its input shaft connected to the engine and a rotating speed of its output shaft by controlling an operating state of the first electric motor, and (c) a second electric motor connected to a power transmitting path between the electrically controlled differential portion and a drive wheel of a vehicle. JP-2005-264762A discloses an example of a control apparatus for such a vehicular drive system. The control apparatus disclosed in this publication is configured to rapidly raise the operating speed of the engine to a value permitting ignition of the engine, by operating the first electric motor and the second electric motor in the same direction, for thereby starting the engine.

In the hybrid-type vehicular drive system as disclosed in the above-identified publication, a switching portion in the form of a clutch device is engaged to switch the above-indicated power transmitting path from the power cut-off state to the power transmitting state upon a shift lever is operated from a neutral position to a forward-drive position while the vehicle is moved down backwards on a downhill roadway, for example, with the shift lever placed in a rear-drive position. An engaging action of the clutch device causes drops of the rotating speed of an output shaft of the differential mechanism and an operating speed of the second electric motor connected to the output shaft of the differential mechanism. Consequently, an inertia torque is generated due to a differential function of the differential mechanism, so as to lower the operating speed of the engine, so that the engine is slightly rotated in the negative direction, giving rise to deterioration of the durability of the engine.

SUMMARY OF THE INVENTION

The present invention was made in view of the background art described above. It is therefore an object of this invention to provide a control apparatus for a vehicular power transmitting system including an electrically controlled differential portion and a switching portion, which control apparatus is configured to reduce a drop of the operating speed of the engine and restrict an operation of the engine in the negative direction.

The object indicated above can be achieved according to any one of the following modes of this invention, each of which is numbered like the appended claims and which depends from the other mode or modes, where appropriate, for easier understanding of technical features disclosed in the present application, and combinations of those features.

(1) A control apparatus for a vehicular power transmitting system including (a) an electrically controlled differential portion which has a differential mechanism and a first electric motor connected to a rotary element of the differential mechanism and which is operable to control a differential state between a rotating speed of its input shaft connected to a drive power source and a rotating speed of its output shaft by controlling an operating state of the first electric motor, and (b) a switching portion operable to switch a power transmitting path for transmitting power from the drive power source, between a power transmitting state and a power cut-off state, the control apparatus comprising:

a control range setting portion configured to set one of two different control ranges of a rotating speed of the output shaft, depending upon whether the above-indicated power transmitting path is placed in the power transmitting state or the power cut-off state, by the switching portion.

In the control apparatus of the above-described mode (1) according to a first aspect of the present invention, the control range setting portion is provided to set one of the two different control ranges of the rotating speed of the output shaft of the electrically controlled differential portion, when the power transmitting path is placed in the power transmitting state by the switching portion, and the other control range when the power transmitting path is placed in the power cut-off state by the switching portion. When the power transmitting path is switched from the power cut-off state to the power transmitting state, the rotating speed of the output shaft is lowered in some running condition of the vehicle, and an inertial torque is generated so as to lower the operating speed of the drive power source. By suitably setting the control range of the speed of the output shaft, that is, by setting a comparatively limited or narrow control range of the output shaft speed, the inertial torque generated can be effectively reduced, and a drop of the operating speed of the drive power source in the negative or reverse direction can be restricted, making it possible to reduce deterioration of the durability of the drive power source due to its operation in the negative or reverse direction.

(2) The control apparatus according to the above-described mode (1), wherein the control range setting portion is configured to set a narrow control range of the rotating speed of the output shaft when the power transmitting path is placed in the power cut-off state, the narrow control range being narrower than a control range to be set when the power transmitting path is placed in the power transmitting state.

In the above-described mode (2) of the invention, the narrower control range of the rotating speed of the output shaft is set when the power transmitting path is placed in the power cut-off state, so that the inertial torque generated so as to lower the operating speed of the drive power source when the power transmitting path is switched from the power cut-off state to the power transmitting state can be effectively reduced, and a drop of the operating speed of the drive power source in the negative or reverse direction can be restricted, making it possible to reduce deterioration of the durability of the drive power source due to its operation in the negative or reverse direction.

(3) The control apparatus according to the above-described mode (1) or (2), wherein the control range setting portion is configured to set the control range of the rotating speed of the output shaft according to a running state of a vehicle provided with the vehicular power transmitting system, for reducing an amount of change of the rotating speed of the output shaft which takes place when the power transmitting path is switched from the power cut-off state to the power transmitting state.

In the above-described mode (3) of this invention, the control range of the rotating speed of the output shaft is set according to the running state of the vehicle, for reducing the amount of change of the rotating speed of the output shaft which takes place upon switching of the power transmitting path from the power cut-off state to the power transmitting state, so that the inertia torque generated so as to lower the operating speed of the drive power source when the power transmitting path is switched from the power cut-off state to the power transmitting state can be effectively reduced (4) The control apparatus according to the above-described mode (3), wherein the running state of the vehicle is a running speed of the vehicle, and the control range setting portion sets the control range according to the running speed of the vehicle.

In the above-described mode (4), the control range of the rotating speed of the output shaft is set according to the running speed of the vehicle, so that the inertia torque which increases with an increase of the vehicle running speed upon switching of the power transmitting path from the power cut-off state to the power transmitting state can be effectively reduced, whereby the operation of the drive power source in the negative or reverse direction can be restricted, and the deterioration of the drivability of the drive power source due to its operation in the negative direction can be reduced.

(5) The control apparatus according to the above-described mode (3), wherein the running state of the vehicle is a difference of an actual operating speed of the drive power source from a target value, and the control range setting portion sets the control range according to the difference.

In the above-described mode (5) of the present invention, the control range of the rotating speed of the output shaft is set according to the difference between the actual and target speed values of the drive power source, so that it is possible to reduce the amount of change of the rotating speed of the output shaft which would take place due to a variation in hydraulic pressure applied to the switching portion (e.g., a clutch device) for switching the power transmitting path from the power cut-off state to the power transmitting state. Accordingly, the inertia torque acting on the drive power source can be effectively reduced, making it possible to reduce deterioration of the durability of the drive power source due to its operation in the negative or reverse direction.

(6) The control apparatus according to the above-described mode (3), wherein the running state of the vehicle is a difference between an operating speed of the drive power source when the power transmitting path is placed in the power cut-off state and the operating speed of the drive power source when the power transmitting path is placed in the power transmitting state, and the control range setting portion sets the control range according to the difference.

In the above-described mode (6), the control range of the rotating speed of the output shaft is set according to the difference between the operating speed of the drive power source when the power transmitting path is placed in the power cut-off state and the operating speed of the drive power source when the power transmitting path is placed in the power transmitting state, so that it is possible to reduce the amount of change of the rotating speed of the output shaft which would take place due to a variation in hydraulic pressure applied to the switching portion (e.g., a clutch device) for switching the power transmitting path from the power cut-off state to the power transmitting state. Accordingly, the inertia torque acting on the drive power source can be effectively reduced, making it possible to reduce deterioration of the durability of the drive power source due to its operation in the negative or reverse direction.

(7) The control apparatus according to the above described mode (3), wherein the running state of the vehicle is a presently selected position of a manually operable shifting member, and the control range setting portion sets the control range according to the presently selected position of the manually operable shifting member.

In the above-described mode (7) of the invention, the control range of the rotating speed of the output shaft is set or changed according to the presently selected position of the manually operable shifting member, so that the inertia torque acting on the drive power can be effectively reduced, and the deterioration of the durability of the drive power source due to its operation in the negative direction can be reduced.

(8) The control apparatus according to the above-described mode (3), wherein the running state of the vehicle is an operating state of a coupling device of the switching portion, and the control range setting portion sets the control range according to the operating state of the coupling device.

In the above-described mode (8) of the present invention, the control range setting portion sets the control range of the rotating speed of the output shaft according to the operating state of the coupling device of the switching portion, so that the control range is changed according to the operating state of the coupling device. Accordingly, the inertia torque acting on the drive power source can be effectively reduced, making it possible to reduce deterioration of the durability of the drive power source due to its operation in the negative or reverse direction.

(9) The control apparatus according to any one of the above-described modes (1)-(8), wherein the control range setting portion is configured to set the control range of the rotating speed of the output shaft according to an operating state of the drive power source.

In the above-described mode (9), the control range of the rotating speed of the output shaft is set according to the operating state of the drive power source, so that the inertia torque acting on the drive power source can be effectively reduced, making it possible to reduce deterioration of the durability of the drive power source due to its operation in the negative or reverse direction.

(10) The control apparatus according to any one of the above-described modes (1)-(9), wherein the control range setting portion changes the control range depending upon whether the drive power source is placed in an operated state or is held at rest.

In the above-described mode (10), the control range is changed depending upon whether the drive power source is placed in an operated state or is held at rest, so that the inertia torque acting on the drive power source can be effectively reduced, making it possible to reduce deterioration of the durability of the drive power source due to its operation in the negative or reverse direction.

(11) The control apparatus according to the above-described mode (9), wherein the operating state of the drive power source is an operating speed of the drive power source.

In the above-described mode (11), the control range of the rotating speed of the output shaft is set according to the operating speed of the drive power source, so that the inertia torque acting on the drive power source can be effectively reduced, making it possible to reduce deterioration of the durability of the drive power source due to its operation in the negative or reverse direction.

(12) The control apparatus according to the above-described modes (1)-(11), wherein the above-indicated power transmitting path is provided between the electrically controlled differential portion and a drive wheel of a vehicle, and includes a step-variable transmission portion provided with the switching portion, and the control range setting portion is configured to set the control range of the operating speed of the output shaft according to a presently established speed ratio of said step-variable transmission portion.

In the above-described mode (12), the control range is set according to the presently established speed ratio of the step-variable transmission portion, so that the inertia torque acting on the drive power source can be effectively reduced, making it possible to reduce deterioration of the durability of the drive power source due to its operation in the reverse direction.

(13) The control apparatus according to any one of the above-described modes (1)-(12), wherein the electrically controlled differential portion further includes, in addition to the first electric motor, a second electric motor connected to another rotary element of the differential mechanism, and is operable as a continuously-variable transmission mechanism when operating states of the first and second electric motors are controlled.

In the above-described mode (13) of this invention wherein the electrically controlled differential portion is operable as a continuously-variable transmission mechanism when operating states of the first and second electric motors are controlled, the vehicle drive torque can be smoothly changed. However, the electrically controlled differential portion can be operated as a step-variable transmission the speed ratio of which is variable in steps, as well as the continuously-variable transmission mechanism the speed ratio of which is continuously variable, so that the overall speed ratio of the vehicular power transmitting system is variable in steps, and the vehicle drive torque can be rapidly changed.

(14) The control apparatus according to any one of the above-described modes (1)-(13), wherein the differential mechanism is a planetary gear set having three rotary elements consisting of a carrier connected to the input shaft of the electrically controlled differential portion, a sun gear connected to the first electric motor, and a ring gear connected to the output shaft of the electrically controlled differential portion.

In the above-described mode (14), the differential mechanism consisting of the single planetary gear set can be simplified in construction, and the required axial dimension of the differential mechanism can be reduced.

(15) The control apparatus according to the above-described mode (14), wherein the planetary gear set is a single-pinion type planetary gear set.

In the above-described mode (15), the differential mechanism consisting of the single single-pinion type planetary gear set can be simplified in construction, and the required axial dimension of the planetary gear set can be reduced.

(16) The control apparatus according to the above-described mode. (12), wherein the vehicular power transmitting system has an overall speed ratio defined by a speed ratio of the step-variable transmission and a speed ratio of the electrically controlled differential portion.

In the above-described mode (16), the vehicle drive force can be obtained over a wide range of speed ratio, by changing the speed ratio of the step-variable transmission portion as well as the speed ratio of the differential portion.

(17) The control apparatus according to the above-described mode (12), wherein the step-variable transmission portion is an automatic transmission.

In the above-described mode (17), the electrically controlled differential portion functioning as an electrically controlled continuously variable transmission cooperates with the step-variable automatic transmission to constitute a continuously variable transmission mechanism which is operable to smoothly change the vehicle drive torque. When the speed ratio of the electrically controlled differential portion is controlled to be held constant, the electrically controlled differential portion and the step-variable transmission portion cooperate with each other to constitute a step-variable transmission mechanism the overall speed ratio of which is variable in steps, permitting a rapid change of the vehicle drive torque.

(18) A control apparatus for a vehicular power transmitting system including (a) an electrically controlled differential portion which has a differential mechanism and a first electric motor connected to a rotary element of the differential mechanism and which is operable to control a differential state between a rotating speed of its input shaft connected to a drive power source and a rotating speed of its output shaft by controlling an operating state of the first electric motor, and (b) a switching portion operable to switch a power transmitting path for transmitting power from the drive power source, between a power transmitting state and a power cut-off state, the control apparatus being characterized by comprising:
a control range setting portion configured to set a control range of the rotating speed of the above-indicated output shaft according to a running state of a vehicle provided with the vehicular power transmitting system, for reducing an amount of change of the rotating speed of the output shaft which takes place when the power transmitting path is switched by the switching portion from the power cut-off state to the power transmitting state.

In the control apparatus of the above-described mode (18) according to a second aspect of the present invention, the control range of the rotating speed of the output shaft of the electrically controlled differential portion is set according to the running state of the vehicle, so as to reduce an amount of change of the rotating speed of the output shaft upon switching of the power transmitting path from the power cut-off state to the power transmitting state, so that the inertia torque generated so as to lower the operating speed of the drive power source is reduced.

(19) The control apparatus according to the above-described mode (18), wherein the running state of the vehicle is a running speed of the vehicle, and the control range setting portion sets the control range.

The above-described mode (19) has the same advantage as described above with respect to the above-described mode (4).

(20) The control apparatus according to the above-described mode (18), wherein the running state of the vehicle is a difference of an actual operating speed of the drive power source from a target value, and the control range setting portion sets the control range according to the difference.

The above-described mode (20) has the same advantage as described above with respect to the above-described mode (5).

(21) The control apparatus according to the above-described mode (18), wherein the running state of the vehicle is a difference between an operating speed of the drive power source when the power transmitting path is placed in the power cut-off state and the operating speed of the drive power source when the power transmitting path is placed in the power transmitting state, and the control range setting portion sets the control range according to the difference.

The above-described mode (21) has the same advantage as described above with the above-described mode (6).

(22) The control apparatus according to the above-described mode (18), wherein the running state of the vehicle is a presently selected position of a manually operable shifting member, and the control range setting portion sets the control range according to the presently selected position of the manually operable shifting member.

The above-described mode (22) has the same advantage as described above with respect to the above-described mode (7).

(23) The control apparatus according to any one of the above-described modes (18)-(23), wherein the running state of the vehicle is an operating state of a coupling device of the switching portion, and the control range setting portion sets the control range according to the operating state of the coupling device.

The above-described mode (23) has the same advantage as descried above with respect to the above-described mode (8).

(24) The control apparatus according to any one of the above-described modes (18)-(24), wherein the control range setting portion is configured to set the control range of the rotating speed of the output shaft according to an operating state of the drive power source.

The above-described mode (24) has the same advantage as described above with respect to the above-described mode (9).

(25) The control apparatus according to any one of the above-described modes (18)-(24), wherein the control range setting portion changes the control range depending upon whether the drive power source is placed in an operated state or is held at rest.

The above-described mode (25) has the same advantage as described above with respect to the above-described mode (10).

(26) The control apparatus according to any one of the above-described modes (18)-(24), wherein the operating state of the drive power source is an operating speed of the drive power source.

The above-described mode (26) has the same advantage as described above with respect to the above-described mode (11).

(27) The control apparatus according to any one of the above-described modes (18)-(26), wherein the above-indicated power transmitting path is provided between the electrically controlled differential portion and a drive wheel of a vehicle, and includes a step-variable transmission portion provided with the switching portion, and the control range setting portion is configured to set the control range of the operating speed of the output shaft according to a presently established speed ratio of said step-variable transmission portion.

The above-described mode (27) has the same advantage as described above with respect to the above-described mode (12).

(28) The control apparatus according to any one of the above-described modes (18)-(27), wherein the electrically controlled differential portion further includes, in addition to the first electric motor, a second electric motor connected to another rotary element of the differential mechanism, and is operable as a continuously-variable transmission mechanism when operating states of the first and second electric motors are controlled.

The above-described mode (28) has the same advantage as described above with respect to the above-described mode (13).

(29) The control apparatus according to any one of the above-described modes (18)-(28), wherein the differential mechanism includes a planetary gear set having three rotary elements consisting of a carrier connected to the input shaft of the electrically controlled differential portion, a sun gear connected to the first electric motor, and a ring gear connected to the output shaft of the electrically controlled differential portion.

The above-described mode (25) has the same advantage as described above with respect to the above-described mode (14).

(30) The control apparatus according to the above-described mode (29), wherein the planetary gear set is a single-pinion type planetary gear set.

The above-described mode (30) of this invention has the same advantage as described above with respect to the above-described mode (15).

(31) The control apparatus according to the above described mode (27), wherein the power transmitting system has an overall speed ratio defined by a speed ratio of the step-variable transmission portion and a speed ratio of the electrically controlled differential portion.

The above-described mode (31) has the same advantage as described above with respect to the above described mode (16).

(32) The control apparatus according to the above-descried mode (27), wherein the step-variable transmission portion is an automatic transmission.

The above-described mode (32) has the same advantage as described above with respect to the above-described mode (17).

BRIEF DESCRIPTION OF THE DRAWINGS

The above and other objects, features, advantages, and technical and industrial significance of this invention will be better understood by reading the following detailed description of preferred embodiments of the present invention, when considered in connection with the accompanying drawings, in which:

FIG. 1 is a schematic view showing an arrangement of a drive system for a hybrid vehicle, which is controlled by a control apparatus constructed according to a first embodiment of this invention;

FIG. 2 is a table indicating shifting actions of an automatic transmission portion provided in the drive system of FIG. 1, in relation to different combinations of operating states of hydraulically operated frictional coupling devices to effect the respective shifting actions;

DETAILED DESCRIPTION OF THE PREFERRED EMBODIMENT

First Embodiment

Figure 7:
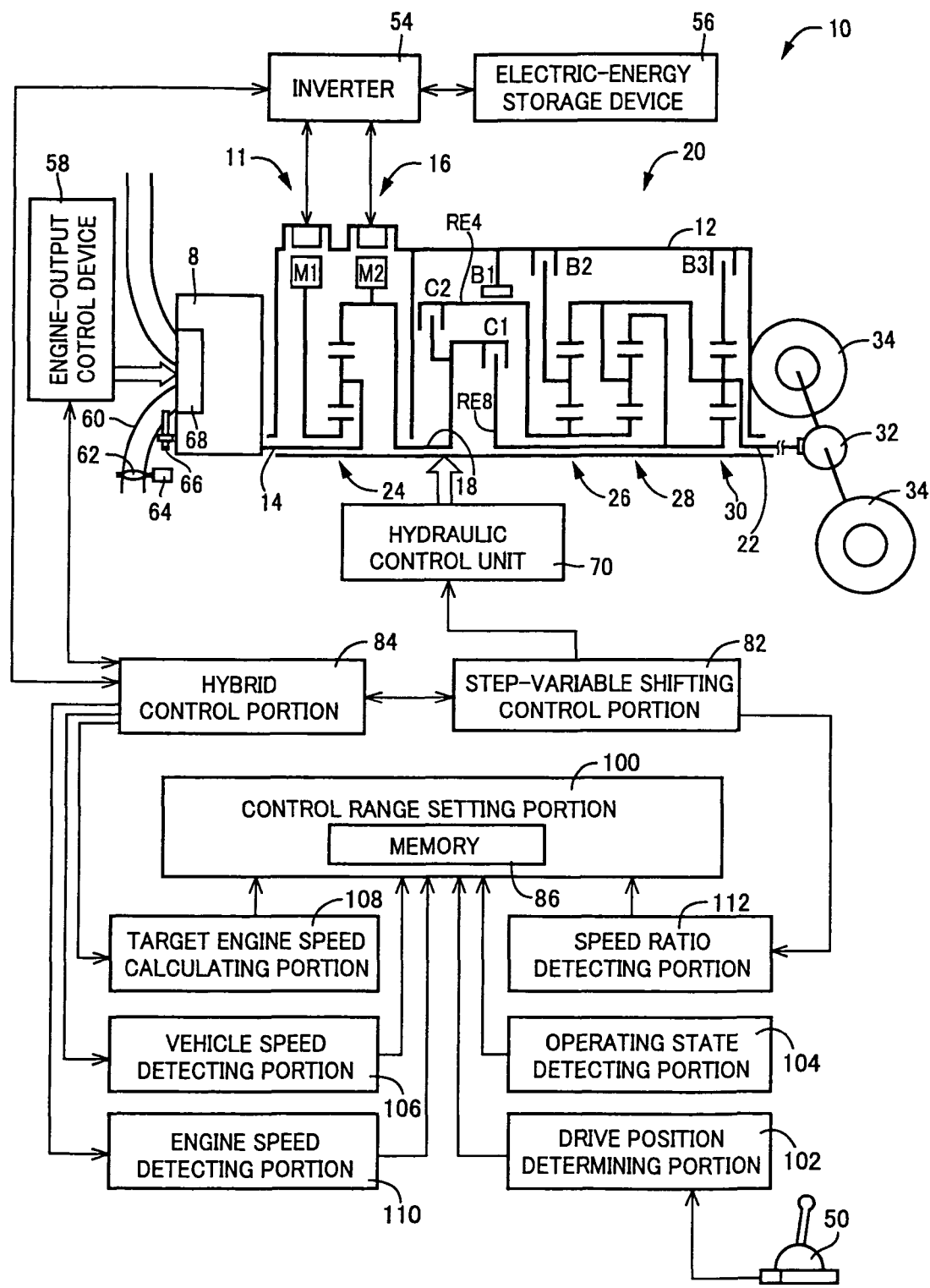
FIG. 7 is a functional block diagram illustrating major control functions of the electronic control device of FIG. 4.

Referring first to the schematic view of FIG. 1, there is shown a transmission mechanism 10 constituting a part of a power transmitting system for a hybrid vehicle, which power transmitting system is controlled by a control apparatus constructed according to a first embodiment of this invention. As shown in FIG. 1, the transmission mechanism 10 includes: an input rotary member in the form of an input shaft 14; a continuously-variable transmission portion in the form of a differential portion 11 connected to the input shaft 14 either directly, or indirectly via a pulsation absorbing damper (vibration damping device) not shown; a power transmitting portion in the form of a hydraulic automatic transmission portion 20 disposed between the differential portion 11 and drive wheels 34 (shown in FIG. 7) of the hybrid vehicle, and connected in series via a power transmitting member 18 (power transmitting shaft) to the differential portion 11 and the drive wheels 34; and an output rotary member in the form of an output shaft 22 connected to the automatic transmission portion 20. The input shaft 14, differential portion 11, automatic transmission portion 20 and output shaft 22 are coaxially disposed on a common axis in a transmission casing 12 (hereinafter referred to simply as "casing 12") functioning as a stationary member attached to a body of the vehicle, and are connected in series with each other. This transmission mechanism 10 is suitably used for a transverse FR vehicle (front-engine, rear-drive vehicle), and is disposed between a drive power source in the form of an internal combustion engine 8 and the pair of drive wheels 34, to transmit a vehicle drive force from the engine 8 to the pair of drive wheels 34 through a differential gear device 32 (final speed reduction gear) and a pair of drive axles, as shown in FIG. 7. The engine 8 may be a gasoline engine or diesel engine and functions as a vehicle drive power source directly connected to the input shaft 14 or indirectly via a pulsation absorbing damper. It will be understood that the engine 8 functions as a drive power source of the drive system, while the transmission mechanism 10 functions as the power transmitting system controlled by the control apparatus according to the principle of this invention.

In the present transmission mechanism 10 constructed as described above, the engine 8 and the differential portion 11 are directly connected to each other. This direct connection means that the engine 8 and the transmission portion 11 are connected to each other, without a fluid-operated power transmitting device such as a torque converter or a fluid coupling being disposed therebetween, but may be connected to each other through the pulsation absorbing damper as described above. It is noted that a lower half of the transmission mechanism 10, which is constructed symmetrically with respect to its axis, is omitted in FIG. 1. This is also true to the other embodiments of the invention described below.

The differential portion 11 is provided with: a first electric motor M1; a power distributing mechanism 16 functioning as a differential mechanism operable to mechanically distribute an output of the engine 8 received by the input shaft 14, to the first electric motor M1 and the power transmitting member 18; and a second electric motor M2 which is operatively connected to and rotated with the power transmitting member 18. Each of the first and second electric motors M1 and M2 used in the present embodiment is a so-called motor/generator having a function of an electric motor and a function of an electric generator. However, the first electric motor M1 should function at least as an electric generator operable to generate an electric energy and a reaction force, while the second electric motor M2 should function at least as a drive power source operable to produce a vehicle drive force. It will be understood that the differential portion 11 functions as an electrically controlled differential portion.

The power distributing mechanism 16 includes, as a major component, a first planetary gear set 24 of a single pinion type having a gear ratio $\rho1$ of about 0.418, for example. The first planetary gear set 24 has rotary elements consisting of: a first sun gear S1, a first planetary gear P1; a first carrier CA1 supporting the first planetary gear P1 such that the first planetary gear P1 is rotatable about its axis and about the axis of the first sun gear S1; and a first ring gear R1 meshing with the first sun gear S1 through the first planetary gear P1. Where the numbers of teeth of the first sun gear S1 and the first ring gear R1 are represented by ZS1 and ZR1, respectively, the above-indicated gear ratio $\rho1$ is represented by ZS1/ZR1.

In the power distributing mechanism 16, the first carrier CA1 is connected to the input shaft 14, that is, to the engine 8, and the first sun gear S1 is connected to the first electric motor M1, while the first ring gear R1 is connected to the power transmitting member 18. The power distributing mechanism 16 constructed as described above is operated in a differential state in which three elements of the first planetary gear set 24 consisting of the first sun gear S1, first carrier CA1 and first ring gear R1 are rotatable relative to each other, so as to perform a differential function. In the differential state, the output of the engine 8 is distributed to the first electric motor M1 and the power transmitting member 18, whereby a portion of the output of the engine 8 is used to drive the first electric motor M1 to generate an electric energy which is stored or used to drive the second electric motor M2. Namely, the differential portion 11 (power distributing mechanism 16) functions as an electric differential device, which is operable in a continuously-variable shifting state (electrically established CVT state) in which the rotating speed of the power transmitting member 18 is continuously variable, irrespective of the rotating speed of the engine 8, namely, placed in the differential state in which a speed ratio $\gamma 0$ (rotating speed $N_{IN}$ of the input shaft 14/rotating speed $N_{18}$ of the power transmitting member 18) of the differential portion 11 is continuously changed from a minimum value $\gamma 0min$ to a maximum value $\gamma 0max$, that is, in the continuously-variable shifting state in which the differential portion 11 functions as an electrically controlled continuously-variable transmission the speed ratio $\gamma 0$ of which is continuously variable from the minimum value $\gamma 0min$ to the maximum value $\gamma 0max$. Thus, the differential portion 11 functions as a continuously-variable transmission mechanism wherein a differential state between the rotating speed of the input shaft 14 connected to the engine 8 and the rotating speed of the power transmitting member 18 operatively connected to the second electric motor M2 is controlled by controlling the operating states of the first electric motor M1, second electric motor M2 and engine 8 that are operatively connected to the power distributing mechanism 16. It will be understood that the power transmitting member 18 functions as a differential mechanism while the power transmitting member 18 functions as an output shaft of the differential mechanism, and as an input shaft of the automatic transmission portion 20.

The automatic transmission portion 20 is a step-variable automatic transmission which constitutes a part of a power transmitting path between the differential portion 11 and the drive wheels 34. The automatic transmission portion 20 includes a single-pinion type second planetary gear set 26, a single-pinion type third planetary gear set 28 and a single-pinion type fourth planetary gear set 30. Thus, the automatic transmission portion 20 is a multiple-step transmission of a planetary gear type. The second planetary gear set 26 has: a second sun gear S2; a second planetary gear P2; a second carrier CA2 supporting the second planetary gear P2 such that the second planetary gear P2 is rotatable about its axis and about the axis of the second sun gear S2; and a second ring gear R2 meshing with the second sun gear S2 through the second planetary gear P2. For example, the second planetary gear set 26 has a gear ratio $\rho 2$ of about 0.562. The third planetary gear set 28 has: a third sun gear S3; a third planetary gear P3; a third carrier CA3 supporting the third planetary gear P3 such that the third planetary gear P3 is rotatable about its axis and about the axis of the third sun gear S3; and a third ring gear R3 meshing with the third sun gear S3 through the third planetary gear P3. For example, the third planetary gear set 28 has a gear ratio $\rho 3$ of about 0.425. The fourth planetary gear set 30 has: a fourth sun gear S4; a fourth planetary gear P4; a fourth carrier CA4 supporting the fourth planetary gear P4 such that the fourth planetary gear P4 is rotatable about its axis and about the axis of the fourth sun gear S4; and a fourth ring gear R4 meshing with the fourth sun gear S4 through the fourth planetary gear P4. For example, the fourth planetary gear set 30 has a gear ratio $\rho 4$ of about 0.421. Where the numbers of teeth of the second sun gear S2, second ring gear R2, third sun gear S3, third ring gear R3, fourth sun gear S4 and fourth ring gear R4 are represented by ZS2, ZR2, ZS3, ZR3, ZS4 and ZR4, respectively, the above-indicated gear ratios $\rho 2$, $\rho 3$ and $\rho 4$ are represented by ZS2/ZR2. ZS3/ZR3, and ZS4/ZR4, respectively. It will be understood that the automatic transmission portion 20 functions as a step-variable transmission portion. It will be understood that the automatic transmission portion 20 functions as a step-variable transmission portion.

In the automatic transmission portion 20, the second sun gear S2 and the third sun gear S3 are integrally fixed to each other as a unit, selectively connected to the power transmitting member 18 through a second clutch C2, and selectively fixed to the casing 12 through a first brake B1. The second carrier CA2 is selectively fixed to the casing 12 through a second brake B2, and the fourth ring gear R4 is selectively fixed to the casing 12 through a third brake B3. The second ring gear R2, third carrier CA3 and fourth carrier CA4 are integrally fixed to each other and fixed to the output shaft 22. The third ring gear R3 and the fourth sun gear S4 are integrally fixed to each other and selectively connected to the power transmitting member 18 through a first clutch C1.

Thus, the automatic transmission portion 20 and the differential portion 11 (power transmitting member 18) are selectively connected to each other through one of the first and second clutches C1, C2, which are provided to shift the automatic transmission portion 20. In other words, the first and second clutches C1, C2 function as coupling devices operable to switch a power transmitting path between the power distributing member 18 and the automatic transmission portion 20 (power transmitting path between the differential portion 11 or power transmitting member 18 and the drive wheels 34), to a selected one of a power transmitting state in which a vehicle drive force can be transmitted through the power transmitting path, and a power cut-off state (non-power-transmitting state) in which the vehicle drive force cannot be transmitted through the power transmitting path. When at least one of the first and second clutches C1 and C2 is placed in the engaged state, the power transmitting path is placed in the power transmitting state. When both of the first and second clutches C1, C2 are placed in the released state, the power transmitting path is placed in the power cut-off state. It will be understood that the first and second clutches C1, C2 function as a switching portion operable to switch the power transmitting path between the differential portion 11 and the drive wheels 34, between the power transmitting state and the power cut-off state.

The automatic transmission portion 20 is operable to perform a so-called "clutch-to-clutch" shifting action to establish a selected one of its operating positions (gear positions) by an engaging action of one of coupling devices and a releasing action of another coupling device. The above-indicated operating positions have respective speed ratios $\gamma$ (rotating speed $N_{18}$ of the power transmitting member 18/rotating speed $N_{OUT}$ of the output shaft 22) which change as geometric series. As indicated in the table of FIG. 2, the first gear position having the highest speed ratio $\gamma 1$ of about 3.357, for example, is established by engaging actions of the first clutch C1 and third brake B3, and the second gear position having the speed ratio $\gamma 2$ of about 2.180, for example, which is lower than the speed ratio γ1, is established by engaging actions of the first clutch C1 and second brake B2. Further, the third gear position having the speed ratio γ3 of about 1.424, for example, which is lower than the speed ratio γ2, is established by engaging actions of the first clutch C1 and first brake B1, and the fourth gear position having the speed ratio γ4 of about 1.000, for example, which is lower than the speed ratio γ3, is established by engaging actions of the first clutch C1 and second clutch C2. The reverse gear position having the speed ratio γR of about 3.209, for example, which is intermediate between the speed ratios γ1 and γ2, is established by engaging actions of the second clutch C2 and the third brake B3, and the neutral position N is established when all of the first clutch C1, second clutch C2, first brake B1, second brake B2 and third brake B3 are placed in the released state.

The above-described first clutch C1, second clutch C2, first brake B1, second brake B2 and third brake B3 (hereinafter collectively referred to as clutches C and brakes B, unless otherwise specified) are hydraulically operated frictional coupling devices used in a conventional vehicular automatic transmission. Each of these frictional coupling devices is constituted by a wet-type multiple-disc clutch including a plurality of friction plates which are forced against each other by a hydraulic actuator, or a band brake including a rotary drum and one band or two bands which is/are wound on the outer circumferential surface of the rotary drum and tightened at one end by a hydraulic actuator. Each of the clutches C1, C2 and brakes B1-B3 is selectively engaged for connecting two members between which each clutch or brake is interposed.

In the transmission mechanism 10 constructed as described above, the differential portion 11 functioning as the continuously-variable transmission and the automatic transmission portion 20 cooperate with each other to constitute a continuously-variable transmission the speed ratio of which is continuously variable. While the differential portion 11 is controlled to hold its speed ratio constant, the differential portion 11 and the automatic transmission portion 20 cooperate to constitute a step-variable transmission the speed ratio of which is variable in steps.

When the differential portion 11 functions as the continuously-variable transmission while the automatic transmission portion 20 connected in series to the differential portion 11 functions as the step-variable transmission, the speed of the rotary motion transmitted to the automatic transmission portion 20 placed in a selected one of the gear positions M (hereinafter referred to as "input speed of the automatic transmission portion 20"), namely, the rotating speed of the power transmitting member 18 (hereinafter referred to as "transmitting-member speed $N_{18}$") is continuously changed, so that the speed ratio of the hybrid vehicle drive system when the automatic transmission portion 20 is placed in the selected gear position M is continuously variable over a predetermined range. Accordingly, an overall speed ratio γT of the transmission mechanism 10 (rotating speed $N_{IN}$ of the input shaft 14/rotating speed $N_{OUT}$ of the output shaft 22) is continuously variable. Thus, the transmission mechanism 10 as a whole is operable as a continuously-variable transmission. The overall speed ratio γT is determined by the speed ratio γ0 of the differential portion 11 and the speed ratio γ of the automatic transmission portion 20.

For example, the transmitting-member speed $N_{18}$ is continuously variable over the predetermined range when the differential portion 11 functions as the continuously-variable transmission while the automatic transmission portion 20 is placed in a selected one of the first through fourth gear positions and reverse gear position as indicated in the table of FIG. 2. Accordingly, the overall speed ratio γT of the transmission mechanism 10 is continuously variable across the adjacent gear positions.

When the speed ratio γ0 of the differential portion 11 is held constant while the clutches C and brakes B are selectively engaged to establish the selected one of the first through fourth gear positions and the reverse gear position, the overall speed ratio γT of the transmission mechanism 10 is variable in step as geometric series. Thus, the transmission mechanism 10 is operable like a step-variable transmission.

When the speed ratio γ0 of the differential portion 11 is held constant at 1, for example, the overall speed ratio γT of the transmission mechanism 10 changes as the automatic transmission portion 20 is shifted from one of the first through fourth gear positions and reverse gear position to another, as indicated in the table of FIG. 2. When the speed ratio γ0 of the differential portion 11 is held constant at a value smaller than 1, for example, at about 0.7, while the automatic transmission portion 20 is placed in the fourth gear position, the overall speed ratio γT of the transmission mechanism 10 is controlled to be about 0.7.

Figure 3:
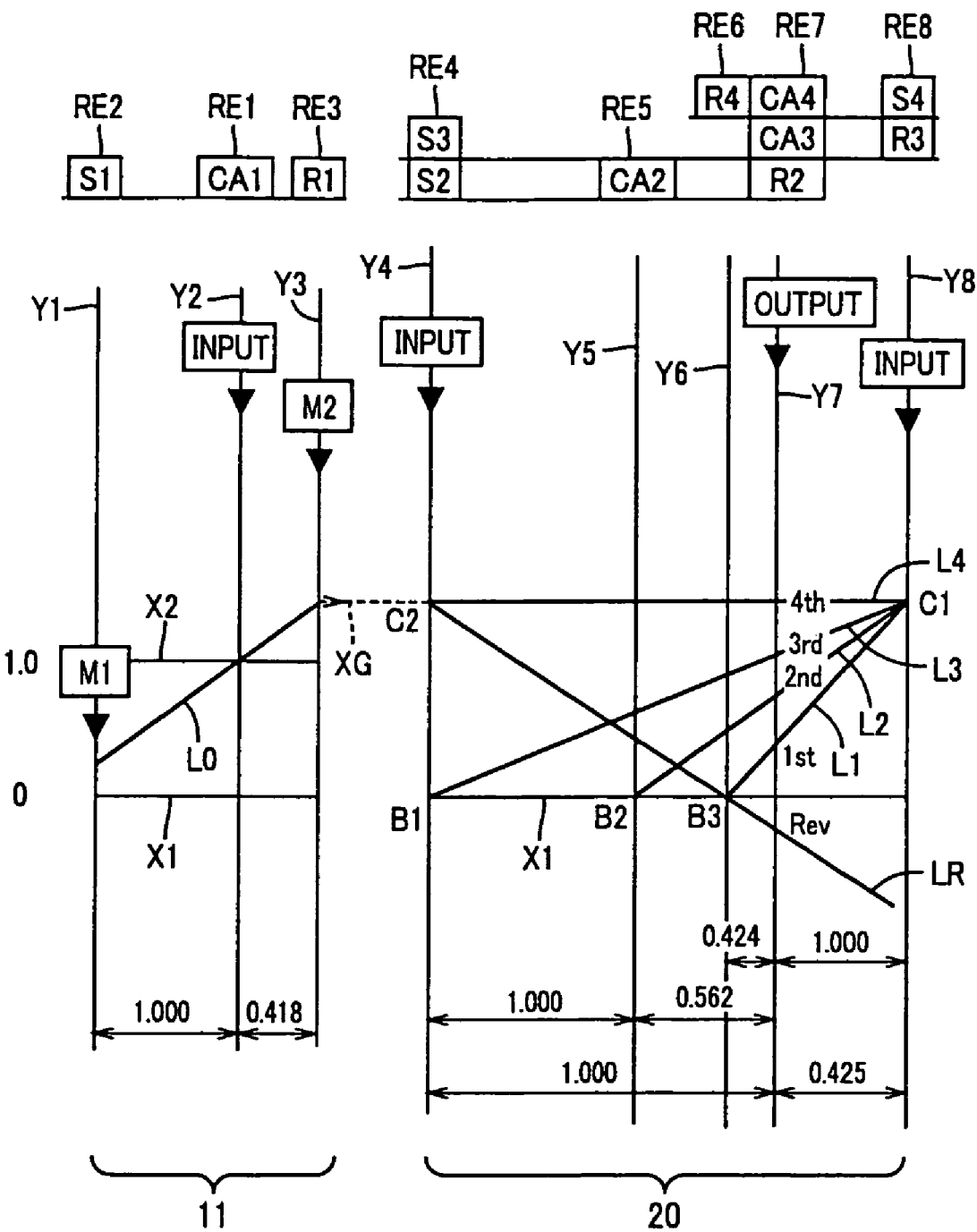
FIG. 3 is a collinear chart indicating relative rotating speeds of rotary elements of a differential portion and the automatic transmission portion of the power transmitting system of FIG. 1.

The collinear chart of FIG. 3 indicates, by straight lines, a relationship among the rotating speeds of the rotary elements in each of the gear positions of the transmission mechanism 10, which is constituted by the differential portion 11 and the automatic transmission portion 20. The different gear positions correspond to respective different states of connection of the rotary elements. The collinear chart of FIG. 3 is a rectangular two-dimensional coordinate system in which the gear ratios ρ of the planetary gear sets 24, 26, 28, 30 are taken along the horizontal axis, while the relative rotating speeds of the rotary elements are taken along the vertical axis. The horizontal line X1 indicates the rotating speed of 0, while the horizontal line X2 indicates the rotating speed of 1.0, that is, an operating speed $N_E$ of the engine 8 connected to the input shaft 14. The horizontal line XG indicates the rotating speed of the power transmitting member 18.

Three vertical lines Y1, Y2 and Y3 corresponding to the power distributing mechanism 16 of the differential portion 11 respectively represent the relative rotating speeds of a second rotary element (second element) RE2 in the form of the first sun gear S1, a first rotary element (first element) RE1 in the form of the first carrier CA1, and a third rotary element (third element) RE3 in the form of the first ring gear R1. The distances between the adjacent ones of the vertical lines Y1, Y2 and Y3 are determined by the gear ratio ρ1 of the first planetary gear set 24. That is, the distance between the vertical lines Y1 and Y2 corresponds to "1", while the distance between the vertical lines Y2 and Y3 corresponds to the gear ratio ρ1. Further, five vertical lines Y4, Y5, Y6, Y7 and Y8 corresponding to the transmission portion 20 respectively represent the relative rotating speeds of a fourth rotary element (fourth element) RE4 in the form of the second and third sun gears S2, S3 integrally fixed to each other, a fifth rotary element (fifth element) RE5 in the form of the second carrier CA2, a sixth rotary element (sixth element) RE6 in the form of the fourth ring gear R4, a seventh rotary element (seventh element) RE7 in the form of the second ring gear R2 and third and fourth carriers CA3, CA4 that are integrally fixed to each other, and an eighth rotary element (eighth element) RE8 in the form of the third ring gear R3 and fourth sun gear S4 integrally fixed to each other. The distances between the adjacent ones of the vertical lines are determined by the gear ratios ρ2, ρ3 and ρ4 of the second, third and fourth planetary gear sets 26, 28, 30. In the relationship among the vertical lines of the collinear chart, the distances between the sun gear and carrier of each planetary gear set corresponds to "1", while the distances between the carrier and ring gear of each planetary gear set corresponds to the gear ratio ρ. In the differential portion 11, the distance between the vertical lines Y1 and Y2 corresponds to "1", while the distance between the vertical lines Y2 and Y3 corresponds to the gear ratio ρ. In the automatic transmission portion 20, the distance between the sun gear and carrier of each of the second, third and fourth planetary gear sets 26, 28, 30 corresponds to "1", while the distance between the carrier and ring gear of each planetary gear set 26, 28, 30 corresponds to the gear ratio ρ.

Referring to the collinear chart of FIG. 3, the power distributing mechanism 16 (differential portion 11) of the transmission mechanism 10 is arranged such that the first rotary element RE1 (first carrier CA1) of the first planetary gear set 24 is integrally fixed to the input shaft 14 (engine 8), and the second rotary element RE2 is fixed to the first electric motor M1, while the third rotary element RE3 (first ring gear R1) is fixed to the power transmitting member 18 and the second electric motor M2, so that a rotary motion of the input shaft 14 is transmitted (input) to the automatic transmission portion 20 through the power transmitting member 18. A relationship between the rotating speeds of the first sun gear S1 and the first ring gear R1 is represented by an inclined straight line L0 which passes a point of intersection between the lines Y2 and X2.

In the differential state of the differential portion 11 in which the first through third rotary elements RE1-RE3 are rotatable relative to each other, for example, the rotating speed of the first sun gear S1, that is, the rotating speed of the first electric motor M1, which is represented by a point of intersection between the straight line L0 and the vertical line Y1, is raised or lowered by controlling the engine speed $N_E$, so that the rotating speed of the first carrier CA1 represented by a point of intersection between the straight line L0 and the vertical line Y2, if the rotating speed of the first ring gear R1 represented by a point of intersection between the straight line L0 and the vertical line Y3 is substantially held constant.

When the rotating speed of the first electric motor M1 is controlled such that the speed ratio γ0 of the differential portion 11 is held at 1, so that the rotating speed of the first sun gear S1 is made equal to the engine speed $N_E$, the straight line L0 is aligned with the horizontal line X2, so that the first ring gear R1, that is, the power transmitting member 18 is rotated at the engine speed $N_E$. When the rotating speed of the first electric motor M1 is controlled such that the speed ratio γ0 of the differential portion 11 is held at a value lower than 1, for example at 0.7, on the other hand, so that the rotating speed of the first sun gear S1 is zeroed, the power transmitting member 18 is rotated at a speed $N_{18}$ higher than the engine speed $N_E$.

In the automatic transmission portion 20, the fourth rotary element RE4 is selectively connected to the power transmitting member 18 through the second clutch C2, and selectively fixed to the casing 12 through the first brake B1, and the fifth rotary element RE5 is selectively fixed to the casing 12 through the second brake B2, while the sixth rotary element RE6 is selectively fixed to the casing 12 through the third brake B3. The seventh rotary element RE7 is fixed to the output shaft 22, while the eighth rotary element RE8 is selectively connected to the power transmitting member 18 through the first clutch C1.

The automatic transmission portion 20 is placed in the first gear position when the first clutch C1 and the third brake B3 are engaged in the state of the differential portion 11 in which a rotary motion of the differential portion 11 at a speed equal to the engine speed $N_E$ is input to the eighth rotary element RE8 of the automatic transmission portion 20. The rotating speed of the output shaft 22 in the first gear position is represented by a point of intersection between the vertical line Y7 indicative of the rotating speed of the seventh rotary element RE7 fixed to the output shaft 22 and an inclined straight line L1 which passes a point of intersection between the vertical line Y8 indicative of the rotating speed of the eighth rotary element RE8 and the horizontal line X2, and a point of intersection between the vertical line Y6 indicative of the rotating speed of the sixth rotary element RE6 and the horizontal line X1, as indicated in FIG. 3. Similarly, the rotating speed of the output shaft 22 in the second gear position established by the engaging actions of the first clutch C1 and second brake B2 is represented by a point of intersection between an inclined straight line L2 determined by those engaging actions and the vertical line Y7 indicative of the rotating speed of the seventh rotary element RE7 fixed to the output shaft 22. The rotating speed of the output shaft 22 in the third gear position established by the engaging actions of the first clutch C1 and first brake B1 is represented by a point of intersection between an inclined straight line L3 determined by those engaging actions and the vertical line Y7 indicative of the rotating speed of the seventh rotary element RE7 fixed to the output shaft 22. The rotating speed of the output shaft 22 in the fourth gear position established by the engaging actions of the first clutch C1 and second clutch C2 is represented by a point of intersection between a horizontal line L4 determined by those engaging actions and the vertical line Y7 indicative of the rotating speed of the seventh rotary element RE7 fixed to the output shaft 22.

Figure 4:
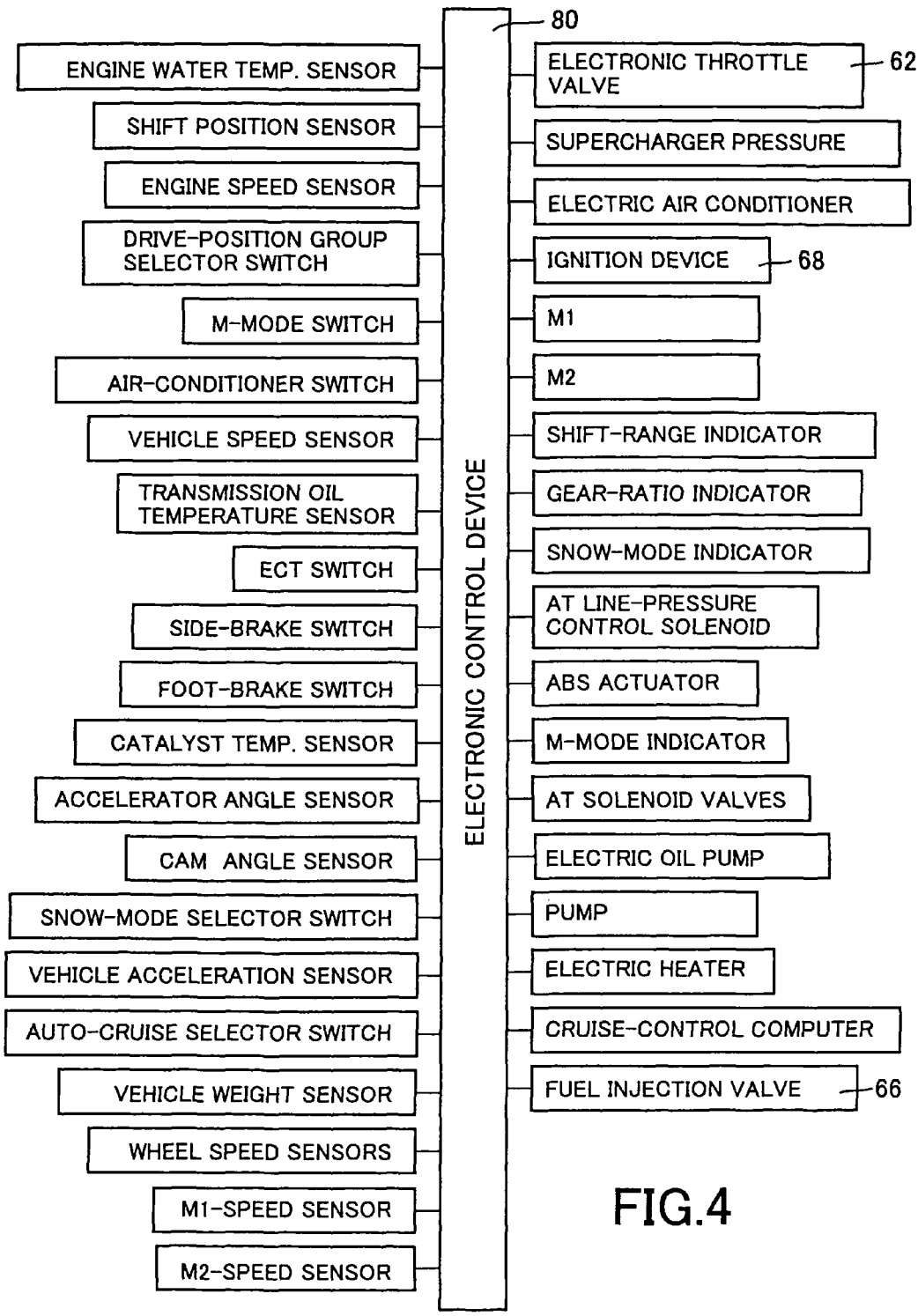
FIG. 4 is a view indicating input and output signals of an electronic control device serving as the control apparatus according to the embodiment of this invention to control the power transmitting system.

FIG. 4 illustrates signals received by an electronic control device 80 provided to control the transmission mechanism 10, and signals generated by the electronic control device 80. This electronic control device 80 includes a so-called microcomputer incorporating a CPU, a ROM, a RAM and an input/output interface, and is arranged to process the signals according to programs stored in the ROM while utilizing a temporary data storage function of the ROM, to implement hybrid drive controls of the engine 8 and first and second electric motors M1 and M2, and drive controls such as shifting controls of the automatic transmission portion 20.

The electronic control device 80 is arranged to receive from various sensors and switches shown in FIG. 4, various signals such as: a signal indicative of a temperature $TEMP_W$ of cooling water of the engine 8; a signal indicative of a selected one of operating positions $P_{SH}$ of a manually operable shifting member in the form of a shift lever 52 (shown in FIG. 6); a signal indicative of the number of operations of the shift lever 52 from a manual forward-drive shifting position M (described below); a signal indicative of the operating speed $N_E$ of the engine 8; a signal indicative of a value indicating a selected group of forward-drive positions of the transmission mechanism 10; a signal indicative of an M mode (manual shifting mode); a signal indicative of an operated state of an air conditioner; a signal indicative of a vehicle speed V corresponding to the rotating speed $N_{OUT}$ of the output shaft 22 (hereinafter referred to as "output shaft speed"); a signal indicative of a temperature $T_{OIL}$ of a working fluid or oil of the automatic transmission portion 20 (hereinafter referred to as "working fluid temperature $TH_{ATF}$"); a signal indicative of an operated state of a side brake; a signal indicative of an operated state of a foot brake pedal; a signal indicative of a temperature of a catalyst; a signal indicative of a required amount of an output of the vehicle in the form of an amount of operation (an angle of operation) $A_{CC}$ of an accelerator pedal; a signal indicative of an angle of a cam; a signal indicative of the selection of a snow drive mode; a signal indicative of a longitudinal acceleration value G of the vehicle; a signal indicative of the selection of an auto-cruising drive mode; a signal indicative of a weight of the vehicle; signals indicative of speeds of the wheels of the vehicle; a signal indicative of a rotating speed $N_{M1}$ of the first electric motor M1 (hereinafter referred to as "first electric motor speed $N_{M1}$"); a signal indicative of a rotating speed $N_{M2}$ of the second electric motor M2 (hereinafter referred to as "second electric motor speed $N_{M2}$"); and a signal indicative of an amount of electric energy SOC stored in an electric-energy storage device 60 (shown in FIG. 7).

The electronic control device 80 is further arranged to generate various signals such as: control signals to be applied to an engine output control device 58 (shown in FIG. 7) to control the output of the engine 8, such as a drive signal to drive a throttle actuator 64 for controlling an angle of opening $\theta_{TH}$ of an electronic throttle valve 62 disposed in an intake pipe 60 of the engine 8, a signal to control an amount of injection of a fuel by a fuel injecting device 66 into the intake pipe 60 or cylinders of the engine 8, a signal to be applied to an ignition device 68 to control the ignition timing of the engine 8, and a signal to adjust a supercharger pressure of the engine 8; a signal to operate the electric air conditioner; signals to operate the first and second electric motors M1 and M2; a signal to operate a shift-range indicator for indicating the selected operating or shift position of the shift lever 52; a signal to operate a gear-ratio indicator for indicating the gear ratio; a signal to operate a snow-mode indicator for indicating the selection of the snow drive mode; a signal to operate an ABS actuator for anti-lock braking of the wheels; a signal to operate an M-mode indicator for indicating the selection of the M-mode; signals to operate solenoid-operated valves in the form of linear solenoid valves incorporated in a hydraulic control unit 70 (shown in FIG. 7) provided to control the hydraulic actuators of the hydraulically operated frictional coupling devices of the differential portion 11 and automatic transmission portion 20; a signal to operate a regulator valve incorporated in the hydraulic control unit 70, to regulate a line pressure PL; a signal to control an electrically operated oil pump which is hydraulic pressure source for generating a hydraulic pressure that is regulated to the line pressure PL; and a signal to drive an electric heater; a signal to be applied to a cruise-control computer.

Figure 5:
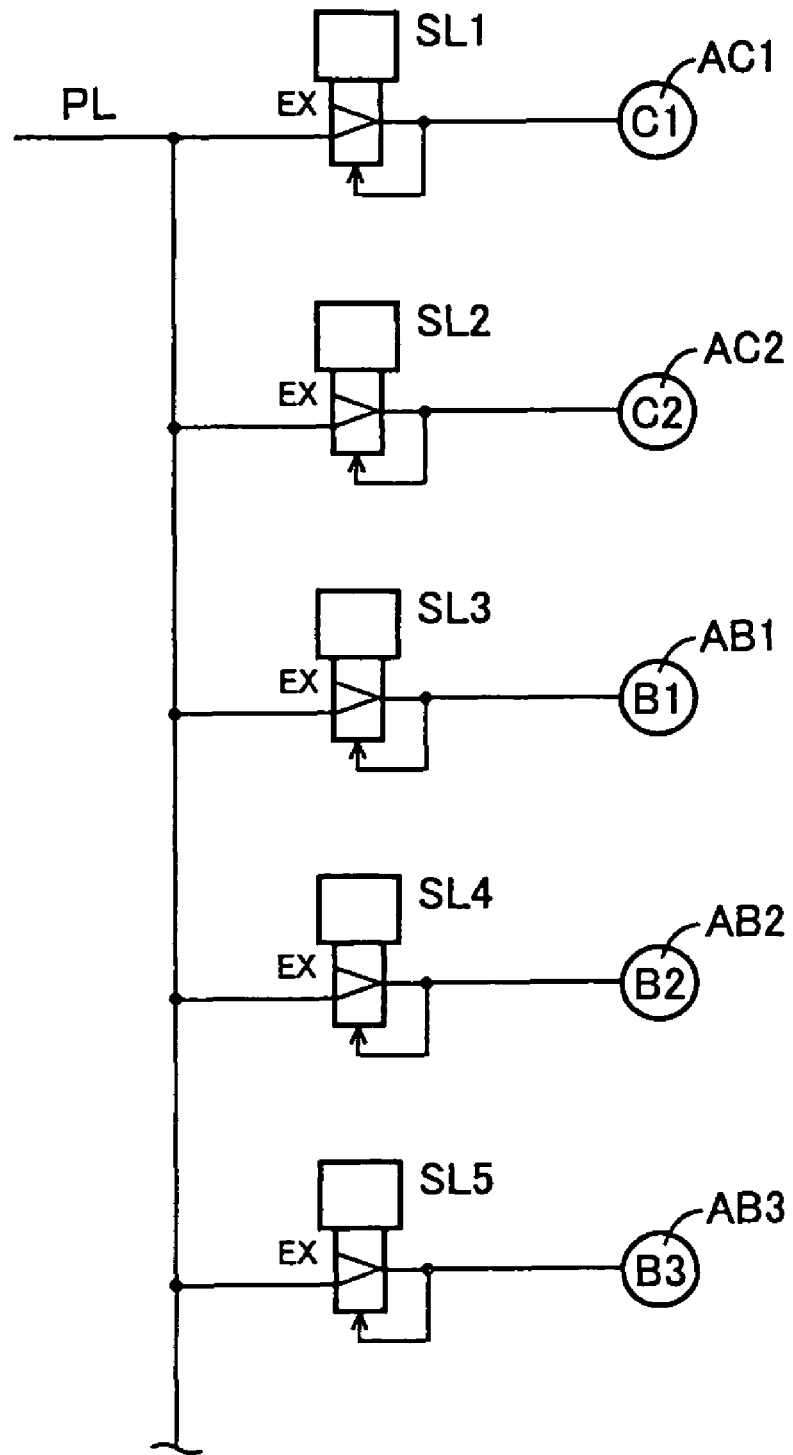
FIG. 5 is a circuit diagram showing hydraulic actuators provided in a hydraulic control unit, for operating clutches C and brakes B incorporated in the automatic transmission portion, and linear solenoid valves for controlling the hydraulic actuators.

FIG. 5 shows a hydraulic circuit of the hydraulic control unit 70 arranged to control linear solenoid valves SL1-SL5 for controlling hydraulic actuators (hydraulic cylinders) AC1, AC2, AB1, AB2 and AB3 for actuating the clutches C1, C2 and brakes B1-B3.

As shown in FIG. 5, the hydraulic actuators AC1, AC2, AB1, AB2, AB3 are connected to the respective linear solenoid valves SL1-SL5, which are controlled according to control commands from the electronic control device 80, for adjusting the line pressure PL into respective engaging pressures PC1, PC2, PB1, PB2 and PB3 to be applied directly to the respective hydraulic actuators AC1, AC2, AB1, AB2, AB3. The line pressure PL is a pressure which is generated by the mechanical oil pump 40 driven by the engine 8 or the electric oil pump 76 provided in addition to the mechanical oil pump 40, and which is regulated by a relief-type pressure regulator valve according to a load of the engine 8 as represented by the operation amount $A_{CC}$ of the accelerator pedal or the opening angle $\theta_{TH}$ of the electronic throttle valve 62, for example.

The linear solenoid valves SL1-SL5 have substantially the same construction, and are controlled independently of each other by the electronic control device 80, to adjust the hydraulic pressures of the hydraulic actuators AC1, AC2, AB1, AB2, AB3 independently of each other, for controlling the engaging pressures PC1, PC2, PB1, PB2, PB3, so that the appropriate two coupling devices (C1, C2, B1, B2, B3) are engaged to shift the automatic transmission portion 20 to the selected operating position or gear position. A shifting action of the automatic transmission portion 20 from one position to another is a so-called "clutch-to-clutch" shifting action involving an engaging action of the coupling devices (C, B) and a releasing action another of the coupling devices, which take place concurrently.

Figure 6:
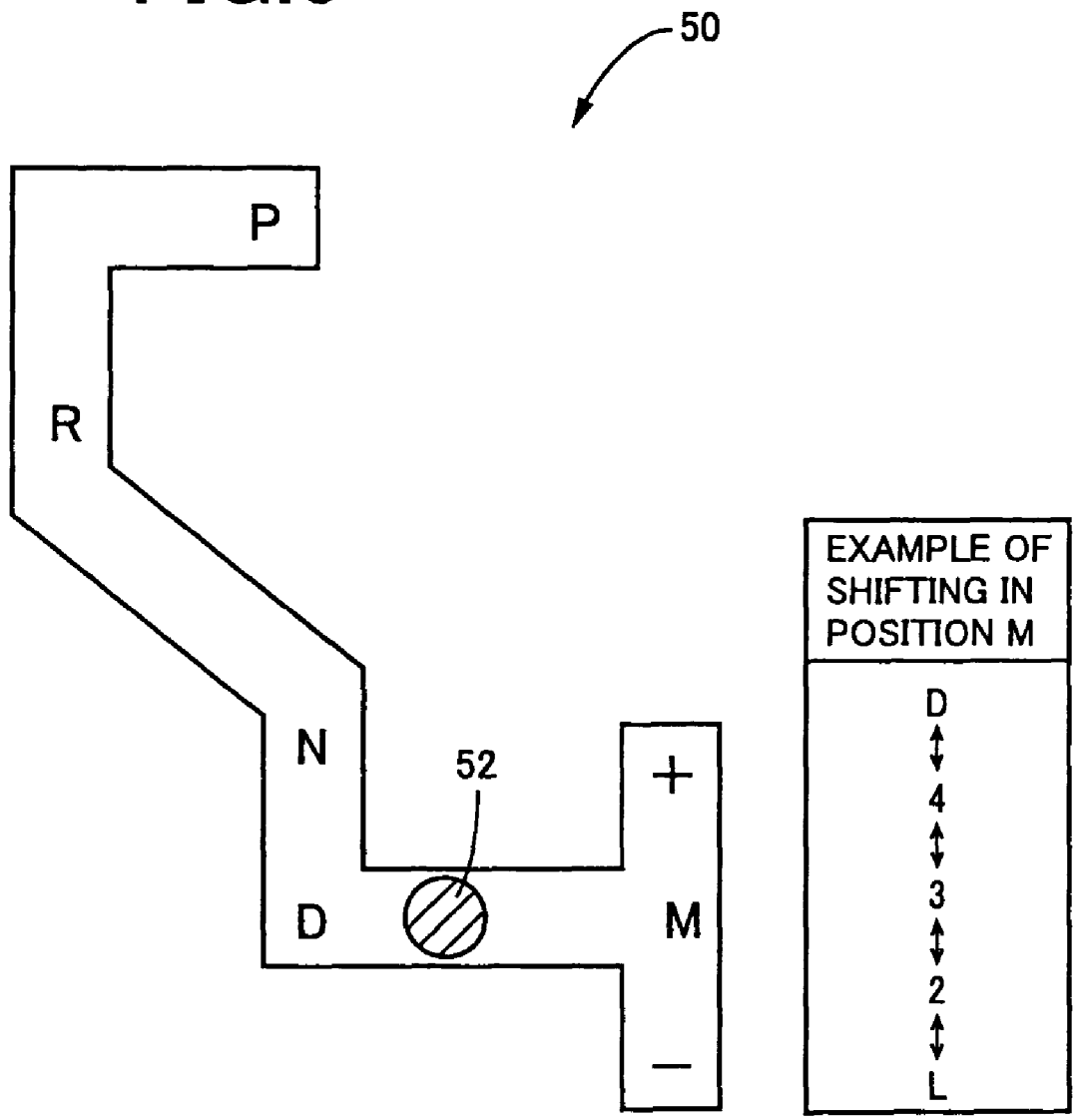
FIG. 6 is a view showing an example of a manually operated shifting device including a shift lever and operable to select one of a plurality of shift positions.

FIG. 6 shows an example of a manually operable shifting device in the form of a shifting device 50. The shifting device 50 includes the above-described shift lever 52, which is disposed laterally adjacent to an operator's seat of the vehicle, for example, and which is manually operated to select one of the plurality of operating positions $P_{SH}$.

The operating positions $P_{SH}$ of the shift lever 52 consists of: a parking position P for placing the transmission mechanism 10 (namely, automatic transmission portion 20) in a neutral state in which a power transmitting path through the automatic transmission portion 20 is disconnected while at the same time the output shaft 22 is placed in the locked state; a reverse-drive position R for driving the vehicle in the rearward direction; a neutral position N for placing the transmission mechanism 10 in the neutral state; an automatic forward-drive shifting position D for establishing an automatic shifting mode; and the above-indicated manual forward-drive shifting position M for establishing a manual shifting mode. In the automatic shifting mode, the overall speed ratio $\gamma T$ is determined by the continuously variable speed ratio of the differential portion 11 and the speed ratio of the automatic transmission portion 20 which changes in steps as a result of an automatic shifting action of the automatic transmission portion 20 from one of the first through fourth gear positions to another. In the manual shifting mode, the number of the gear positions available is limited by disabling the automatic transmission portion 20 to be shifted to the relatively high gear position or positions.

As the shift lever 52 is operated to a selected one of the operating positions $P_{SH}$, the hydraulic control unit 70 is electrically operated to switch the hydraulic circuit to establish the rear-drive position R, neutral position N, and one of the forward-drive first through fourth gear positions, as indicated in the table of FIG. 2.

The above-indicated parking position P and the neutral position N are non-drive positions selected when the vehicle is not driven, while the above-indicated reverse-drive position R, and the automatic and manual forward-drive positions D, M are drive positions selected when the vehicle is driven. In the non-drive positions P, N, the power transmitting path in the automatic transmission portion 20 is in the power cut-off state established by releasing both of the clutches C1 and C2, as shown in the table of FIG. 2. In the drive positions R, D, M, the power transmitting path in the automatic transmission portion 20 is in the power transmitting state established by engaging at least one of the clutches C1 and C2, as also shown in the table of FIG. 2.

Described in detail, a manual operation of the shift lever 52 from the parking position P or neutral position N to the reverse-drive position R causes the second clutch C2 to be engaged for switching the power transmitting path in the automatic transmission portion 20 from the power-cut-off state to the power-transmitting state. A manual operation of the shift lever 52 from the neutral position N to the automatic forward-drive position D causes at least the first clutch C1 to be engaged for switching the power transmitting path in the automatic transmission portion 20 from the power-cut-off state to the power-transmitting state. A manual operation of the shift lever 52 from the rear-drive position R to the parking position P or neutral position N cause the second clutch C2 to be released for switching the power transmitting path in the automatic transmission portion 20 from the power-transmitting state to the power-cut-off state. A manual operation of the shift lever 52 from the automatic forward-drive position D to the neutral position N causes the first clutch C1 and the second clutch C2 to be released for switching the power transmitting path from the power-transmitting state to the power-cut-off state.

Figure 8:
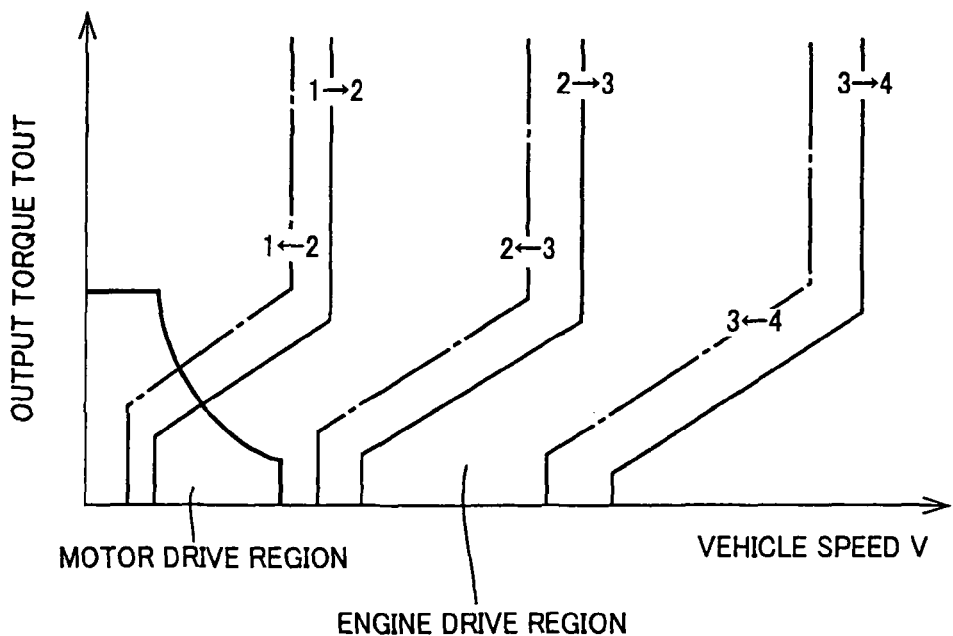
FIG. 8 is a view illustrating an example of a stored shifting boundary line map used for determining a shifting action of the automatic transmission portion, and an example of a stored drive-power-source switching boundary line map used for switch a vehicle drive mode between an engine drive mode and a motor drive mode, the shifting and switching boundary line maps being defined in the same two-dimensional coordinate system, in relation to each other.

Referring to the functional block diagram of FIG. 7, the electronic control device 80 includes a step-variable shifting control portion 82, a hybrid control portion 84, a control range setting portion 100, a drive position determining portion 102, an operating state detecting portion 104, a vehicle speed detecting portion 106, a target engine speed calculating portion 108, an engine speed detecting portion 110 and a speed ratio detecting portion 112. The step-variable shifting control portion 82 is configured to determine whether a shifting action of the automatic transmission portion 20 should take place, that is, to determine the gear position to which the automatic transmission portion 20 should be shifted. This determination is made on the basis of a condition of the vehicle represented by the actual vehicle running speed V and the actual output torque $T_{OUT}$ of the automatic transmission portion 20, and according to a stored shifting boundary line map (shifting control map or relation) which represents shift-up boundary lines indicated by solid lines in FIG. 8 and shift-down boundary lines indicated by one-dot chain lines in FIG. 8.

The step-variable shifting control portion 82 generates a shifting command (hydraulic control command) to be applied to the hydraulic control unit 70, to engage and release the appropriate two hydraulically operated frictional coupling devices (C1, C2, B1, B2, B3), for establishing the determined gear position of the automatic transmission portion 20 according to the table of FIG. 2. Described in detail, the step-variable shifting control portion 82 commands the hydraulic control unit 70 to control the appropriate two linear solenoid valves SL incorporated in the hydraulic control unit 70, for activating the appropriate hydraulic actuators of the appropriate two frictional coupling devices (C, B) to concurrently engage one of the two frictional coupling devices and release the other frictional coupling device, to effect the clutch-to-clutch shifting action of the automatic transmission portion 20 to the determined gear position.

The hybrid control portion 84 controls the engine 8 to be operated with high efficiency, and controls the first and second electric motors M1, M2 so as to optimize a proportion of drive forces generated by the engine 8 and the second electric motor M2, and a reaction force generated by the first electric motor M1 during its operation as the electric generator, for thereby controlling the speed ratio γ0 of the differential portion 11 operating as the electric continuously-variable transmission. For instance, the hybrid control portion 84 calculates a target (required) vehicle output at the present running speed V of the vehicle, on the basis of the operation amount $A_{CC}$ of the accelerator pedal 74 used as an operator's required vehicle output and the vehicle running speed V, and calculate a target total vehicle output on the basis of the calculated target vehicle output and a required amount of generation of an electric energy by the first electric motor M1. The hybrid control portion 84 calculates a target output of the engine 8 to obtain the calculated target total vehicle output, while taking account of a power transmission loss, a load acting on various devices of the vehicle, an assisting torque generated by the second electric motor M2, etc. The hybrid control portion 84 controls the speed $N_E$ and torque $T_E$ of the engine 8, so as to obtain the calculated target engine output, and the amount of generation of the electric energy by the first electric motor M1.

Figure 9:
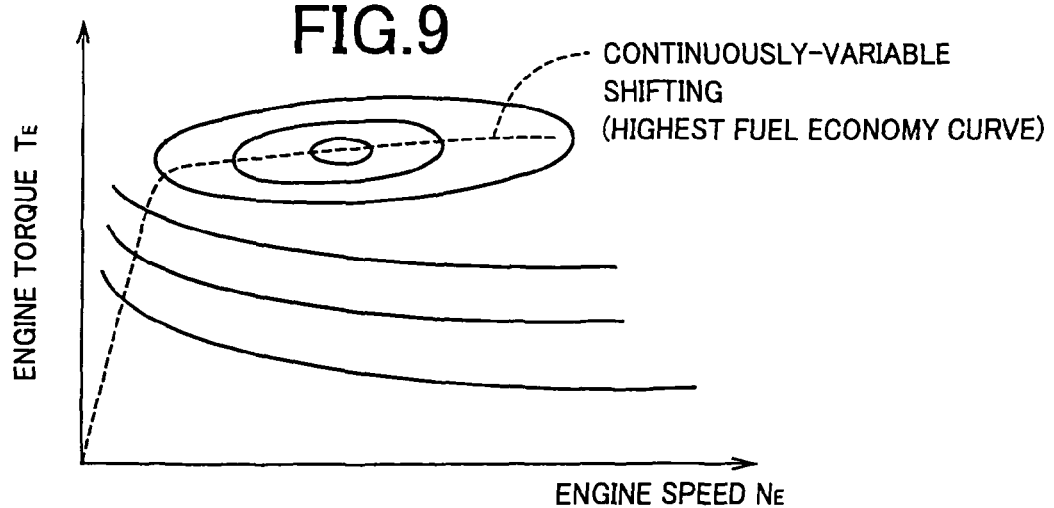
FIG. 9 is a view illustrating an example of a fuel consumption map defining a highest-fuel-economy curve of an engine (indicated by broken line)

The hybrid control portion 84 is arranged to implement the hybrid control while taking account of the presently selected gear position of the automatic transmission portion 20, so as to improve the drivability of the vehicle and the fuel economy of the engine 8. In the hybrid control, the differential portion 11 is controlled to function as the electric continuously-variable transmission, for optimum coordination of the engine speed $N_E$ for its efficient operation, and the rotating speed of the power transmitting member 18 determined by the vehicle speed V and the selected gear position of the transmission portion 20. That is, the hybrid control portion 82 determines a target value of the overall speed ratio γT of the transmission mechanism 10, so that the engine 8 is operated according to a stored highest-fuel-economy curve (fuel-economy map or relation) indicated by broken line in FIG. 9. The target value of the overall speed ratio γT of the transmission mechanism 10 permits the engine torque $T_E$ and speed $N_E$ to be controlled so that the engine 8 provides an output necessary for obtaining the target vehicle output (target total vehicle output or required vehicle drive force). The highest-fuel-economy curve is obtained by experimentation so as to satisfy both of the desired operating efficiency and the highest fuel economy of the engine 8, and is defined in a two-dimensional coordinate system defined by an axis of the engine speed $N_E$ and an axis of the engine torque $T_E$. The hybrid control portion 82 controls the speed ratio γ0 of the differential portion 11, so as to obtain the target value of the overall speed ratio γT, so that the overall speed ratio γT can be controlled within a predetermined range.

In the hybrid control, the hybrid control portion 84 controls an inverter 54 such that the electric energy generated by the first electric motor M1 is supplied to an electric-energy storage device 56 and the second electric motor M2 through the inverter 54. That is, a major portion of the drive force produced by the engine 8 is mechanically transmitted to the power transmitting member 18, while the remaining portion of the drive force is consumed by the first electric motor M1 to convert this portion into the electric energy, which is supplied through the inverter 54 to the second electric motor M2, so that the second electric motor M2 is operated with the supplied electric energy, to produce a mechanical energy to be transmitted to the power transmitting member 18. Thus, the drive system is provided with an electric path through which an electric energy generated by conversion of a portion of a drive force of the engine 8 is converted into a mechanical energy.

The hybrid control portion 84 is further arranged to hold the engine speed $N_E$ substantially constant or at a desired value, by controlling the first electric motor speed $N_{M1}$ and/or the second electric motor speed $N_{M2}$ owing to the electric CVT function of the differential portion 11, irrespective of whether the vehicle is stationary or running. In other words, the hybrid control portion 84 is capable of controlling the first electric motor speed $N_{M1}$ as desired while holding the engine speed $N_E$ substantially constant or at a desired value. For example, the hybrid control portion 84 raises the engine speed $N_E$ by raising the first electric motor speed $N_{M1}$ during running of the vehicle while the second electric motor speed $N_{M2}$ determined by the vehicle running speed V (rotating speed of the drive wheels 34) is held substantially constant.

To raise the engine speed $N_E$ during running of the vehicle, for example, the hybrid control portion 84 raises the first electric motor speed $N_{M1}$ while the second electric motor speed $N_{M2}$ determined by the vehicle speed V (rotating speed of the drive wheels 34) is held substantially constant, as is apparent from the collinear chart of FIG. 3. To hold the engine speed $N_E$ substantially constant during a shifting action of the automatic transmission portion 20, the hybrid control portion 84 changes the first electric motor speed $N_{M1}$ in a direction opposite to a direction of change of the second electric motor speed $N_{M2}$ due to the shifting action of the automatic transmission portion 20.

The hybrid control portion 84 includes engine output control means functioning to command the engine-output control device 58 for controlling the engine 8, so as to provide a required output, by controlling the throttle actuator 64 to open and close the electronic throttle valve 62, and controlling an amount and time of fuel injection by the fuel injecting device 66 into the engine 8, and/or the timing of ignition of the igniter by the ignition device 68, alone or in combination.

For instance, the hybrid control portion 84 is basically arranged to control the throttle actuator 64 on the basis of the operation amount $A_{CC}$ of the accelerator pedal and according to a predetermined stored relationship (not shown) between the operation amount $A_{CC}$ and the opening angle $\theta_{TH}$ of the electronic throttle valve 62 such that the opening angle $\theta_{TH}$ increases with an increase of the operation amount $A_{CC}$. The engine output control device 58 controls the throttle actuator 64 to open and close the electronic throttle valve 62, controls the fuel injecting device 66 to control the fuel injection, and controls the ignition device 68 to control the ignition timing of the igniter, for thereby controlling the torque of the engine 8, according to the commands received from the hybrid control portion 84.

The hybrid control portion 84 is capable of establishing a motor-drive mode to drive the vehicle by the electric motor, by utilizing the electric CVT function (differential function) of the differential portion 11, irrespective of whether the engine 8 is in the non-operated state or in the idling state. For example, the hybrid control portion 84 establishes the motor-drive mode, when the operating efficiency of the engine 8 is relatively low, or when the vehicle speed V is comparatively low or when the vehicle is running in a low-load state. For reducing a dragging of the engine 8 in its non-operated state and improving the fuel economy in the motor-drive mode, the hybrid control portion 84 is configured to hold the engine speed $N_E$ at zero or substantially zero as needed, owing to the electric CVT function (differential function) of the differential portion 11, that is, by controlling the differential portion 11 to perform its electric CVT function, so that the first electric motor speed $N_{M1}$ is controlled to be in a non-load state, so as to be freely rotated to have a negative speed $N_{M1}$.

The hybrid control portion 84 is further capable of performing a so-called "drive-force assisting" operation (torque assisting operation) to assist the engine 8, even in the engine-drive region of the vehicle condition, by supplying an electric energy from the first electric motor M1 or the electric-energy storage device 60 to the second electric motor M2 through the above-described electric path, so that the second electric motor M2 is operated to transmit a drive torque to the drive wheels 34.

The hybrid control portion 84 is further configured to place the first electric motor M1 in a non-load state in which the first electric motor M1 is freely rotated, so that the differential portion 11 is placed in a state similar to the power cut-off state in which power cannot be transmitted through the power transmitting path within the differential portion 11, and no output can be generated from the differential portion 11. Namely, the hybrid control portion 84 is arranged to place the first electric motor M1 in the non-load state, for thereby placing the differential portion 11 in a neutral state in which the power transmitting path is electrically cut off.

The hybrid control portion 84 functions as regeneration control means for operating the second electric motor M2 as the electric generator with a kinetic energy of the running vehicle, that is, with a drive force transmitted from the drive wheels 34 toward the engine 8, during coasting of the vehicle with the accelerator pedal 74 placed in the non-operated position, or during brake application to the vehicle with hydraulically operated wheel brakes 86 for the drive wheels 34, which are shown in FIG. 7. An electric energy generated by the second electric motor M2 is stored in the electric-energy storage device 56 through the inverter 54, for improving the fuel economy of the vehicle. The amount of electric energy to be generated by the second electric motor M2 is determined on the basis of the electric energy amount SOC stored in the electric-energy storage device 56, and a desired proportion of a regenerative braking force produced by the second electric motor M2 operated as the electric generator, with respect to a total braking force which corresponds to the operating amount of a brake pedal and which consists of the regenerative braking force and a hydraulic braking force produced by the hydraulically operated wheel brakes 86.

When the power transmitting path between the differential portion 11 and the drive wheels 34 is switched from the power cut-off state to the power transmitting state by engaging actions of the selected frictional coupling devices such as the first clutch C1 of the automatic transmission portion 20, the rotating speed $N_{18}$ of the power transmitting member 18 which functions as the input shaft of the automatic transmission portion 20 may considerably vary depending upon the state of the vehicle. When the shift lever 52 is operated from the non-drive position in the form of the neutral position N to the drive position in the form of the automatic forward-drive position D while the vehicle is moved backwards with the shift lever 52 placed in the neutral position N, one of the forward drive gear positions such as the first gear position is established while the vehicle speed V is a negative value, that is, while the output shaft 22 of the automatic transmission portion 20 is rotated in the reverse direction (negative direction), so that the rotating speed $N_{18}$ of the power transmitting member 18 and the operating speed $N_{M2}$ of the second electric motor M2 connected to the power transmitting member 18 are rapidly lowered to negative values, namely, the power transmitting member 18 and the second electric motor M2 are rotated or operated in the reverse direction. Consequently, an inertia torque is generated due to the differential function of the power distributing mechanism 16, so as to rapidly lower the operating speed $N_E$ of the engine 8, so that the engine 8 is slightly operated in the negative direction, giving rise to a risk of deterioration of the durability of the engine 8. In view of this drawback, the control range setting portion 100 is provided according to the principle of the present invention, to suitably set a control range of the rotating speed $N_{18}$ of the power transmitting member 18 (operating speed $N_{M2}$ of the second electric motor M2), for reducing the inertia torque acting on the engine 8, to thereby prevent the operation of the engine 8 in the reverse or backward direction. In this respect, it is noted that the rotating speed $N_{18}$ of the power transmitting member 18 can be controlled by controlling the second electric motor M2 operatively connected to the power transmitting member 18 such that the rotating speed $N_{18}$ and the second electric motor speed $N_{M2}$ are equal to each other.

Figure 10:
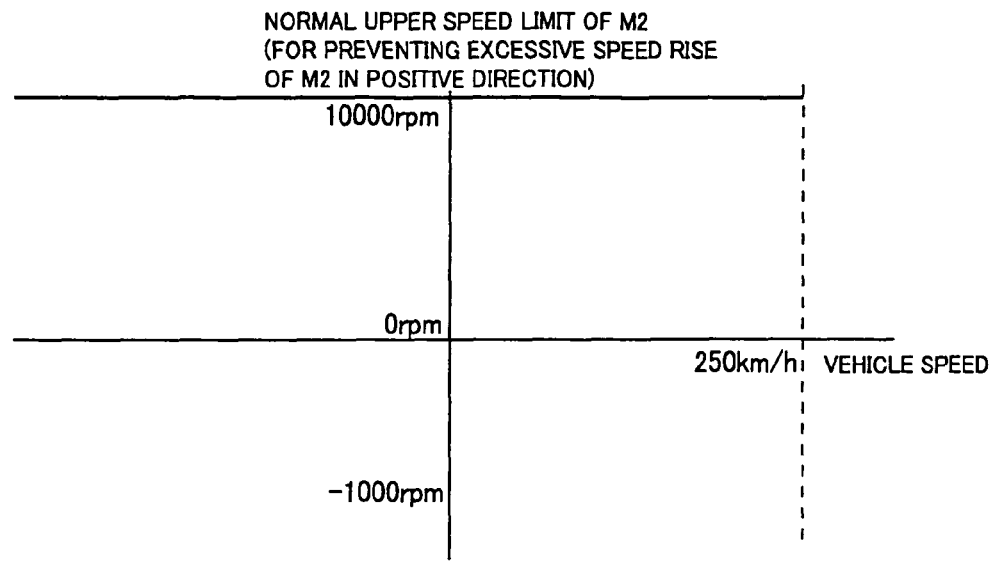
FIG. 10 is a view showing a map indicative of a relation between a vehicle speed and an upper limit of an operating speed of a second electric motor while a shift lever is placed in a drive position.

The control range setting portion 100 is configured to set different control ranges of the rotating speed $N_{18}$ for the power transmitting state and power cut-off states of the power transmitting path. That is, the control range setting portion 100 selects one of the two different control ranges, that is, either a normal control range or a comparatively narrow (limited) control range, depending upon a presently establish one of the power transmitting and power cut-off states, which is detected by the drive position determining portion 102. The two control ranges are stored in a memory 86 (shown in FIG. 7) of the control range setting portion 100. The drive position determining portion 102 is configured to determine whether the presently established or selected position of the shift lever 52 is one of the drive positions D, R and M which establish the power transmitting state of the power transmitting path (between the differential portion 11 and the drive wheels 34). That is, the drive position determining portion 102 determines whether the power transmitting path is placed in the power transmitting state with the selected frictional coupling devices such as the first clutch C1 placed in the engaged state. When the drive position determining portion 102 determines that the shift lever 52 is placed in any drive position (the power transmitting path is placed in the power transmitting state), the control range setting portion 100 selects or sets the normal control range stored in the memory 86, for normal control of the drive force of the second electric motor M2 and engine 8, so as to prevent an excessive rise of the operating speed $N_{M2}$ of the second electric motor M2 in the positive or forward direction. An example of the normal control range is represented by a map of FIG. 10 which is stored in the memory 86 and which indicates a relation between the vehicle speed V and an upper speed limit $N_{MAX}$ of the second electric motor M2 while the shift lever 52 is placed in the drive position. Since the operating speed $N_{M2}$ of the second electric motor M2 is equal to the rotating speed $N_{18}$ of the power transmitting member 18, an upper speed limit of the power transmitting member 18 is equal to the upper speed limit $N_{MAX}$. The upper speed limit $N_{MAX}$ of the second electric motor M2 is suitably determined depending upon the capacity of the second electric motor M2, for example, about 1000 rpm, as indicated in FIG. 10. A lower speed limit $N_{MIN}$ (not indicated in FIG. 10) of the second electric motor M2 may be similarly determined for preventing an excessive rise of the speed $N_{M2}$ in the negative or reverse direction. The lower speed limit $N_{MIN}$ is a negative value, and indicates the upper limit of the speed in the negative or reverse direction.

When the drive position determining portion 102 determines that the shift lever 52 is placed in the non-drive or neutral position N (the power transmitting path is placed in the power cut-off state), the control range setting portion 100 selects or sets the narrow control range stored in the memory 86, for preventing an excessive rise of the speed $N_{M2}$ of the second electric motor M2 (speed $N_{18}$ of the power transmitting member 18) in the negative direction, as well as for preventing an excessive rise of the speed $N_{M2}$ in the positive direction. An example of the narrow control range is represented by a map of FIG. 11 which is also stored in the memory 86 and which indicates a relation between the vehicle speed V and the upper speed limit $N_{MAX}$ (positive value) and a lower speed limit $N_{MIN}$ (negative value) of the second electric motor M2 while the shift lever 52 is placed in the drive position. While the vehicle speed V is zero or a positive value, the upper speed limit $N_{MAX}$ of the narrow control range is the same as that of the normal control range of FIG. 10. While the vehicle speed V is a negative value, that is, while the vehicle is moved backwards, the lower speed limit $N_{MIN}$ of the second electric motor speed $N_{M2}$ (rotating speed $N_{18}$) is set, that is, the speed $N_{M2}$ in the negative or reverse direction is limited, as indicated by a solid line in FIG. 11. Described in detail, the absolute value of the lower speed limit $N_{MIN}$ increases with an increase of the absolute value of the vehicle speed V I the negative or reverse direction. In other words, the upper limit of the speed $N_{M2}$ in the negative direction increases with an increase of the speed V at which the vehicle is moved backwards. Thus, the different control ranges (normal control range and narrow control range) of the rotating speed $N_{18}$ of the power transmitting member 18 are selectively set by the control range setting portion 100, for the respective drive position and non-drive position of the shift lever 51, that is, for the respective power transmitting state and power cut-off state of the power transmitting path for transmitting power from the engine 8 toward the drive wheels 34. In other words, one of the normal and narrow control ranges of the speed $N_{18}$ is selectively set depending upon whether the power transmitting path is placed in the power cut-off state by the switching portion in the form of the first and second clutches C1, C2 under the control of the step-variable shifting control portion 82.

By thus setting the comparatively narrow or limited control range of the operating speed $N_{M2}$ of the second electric motor M2 (rotating speed $N_{18}$ of the power transmitting member 18) while the power transmitting path is placed in the non-drive position, the upper limit of the speed $N_{M2}$ in the negative or reverse direction is suitably limited upon operation of the shift lever 52 from the neutral position N to the forward-drive position D, for example, while the vehicle is moved down backwards on a downhill roadway with the shift lever 52 placed in the neutral position N. Accordingly, amounts of change of the speed $N_{M2}$ of the second electric motor M2 and the speed $N_{18}$ of the power transmitting member 18 are reduced, and an operation of the engine 8 in the negative or reverse direction is restricted. The lower speed limit $N_{MIN}$ for preventing an excessive rise of the speed $N_{M2}$ in the negative direction is obtained by experimentation so as to minimize the amount of change of the speed Nm of the second electric motor M2 due to engaging actions of the frictional coupling devices incorporated in the automatic transmission portion 20.

Figure 12:
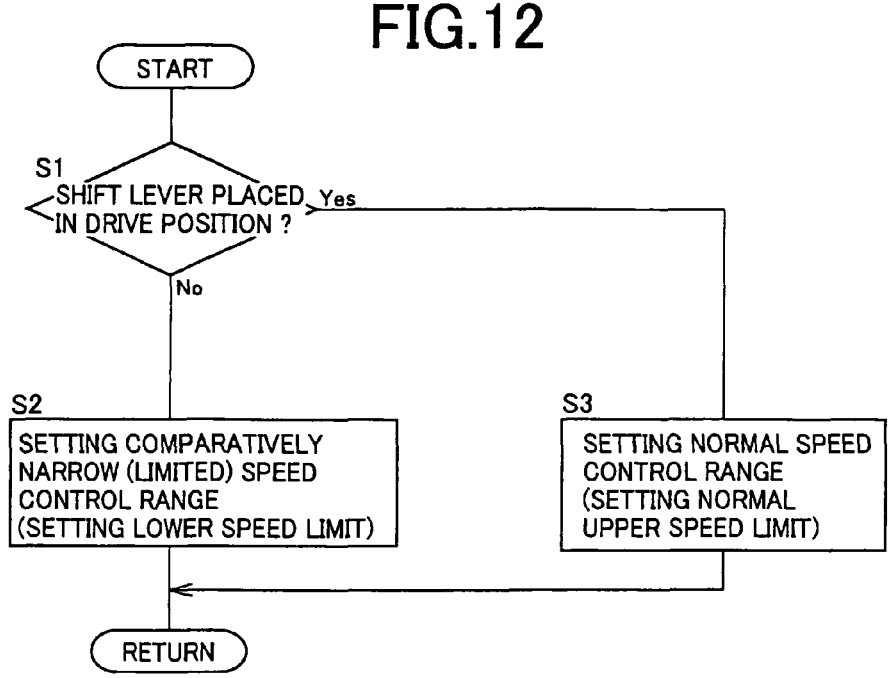
FIG. 12 is a flow chart illustrating a control routine executed by the electronic control device of FIG. 4, for reducing an amount of change of the rotating speed of a power transmitting member, to restrict an operation of the engine in the negative direction.

Referring next to the flow chart of FIG. 12, there will be described a control routine executed by the electronic control device 80 for reducing the amount of change of the speed $N_{18}$ of the power transmitting member 18 and the speed $N_{M2}$ of the second electric motor M2, and restricting an operation of the engine 8 in the negative direction, upon switching of the power transmitting path from the power cut-off state to the power transmitting state. This control routine is repeatedly executed with an extremely short cycle time of about several milliseconds to about several tends of milliseconds.

The control routine is initiated with step S1 corresponding to the drive position determining portion 102, to determine whether the shift lever 52 is placed in any one of the drive positions D, R, M. If an affirmative determination is obtained in S1, the control flow goes to step S3 corresponding to the control range setting portion 100, to set or select the normal control range represented by the map indicated in FIG. 10, for preventing an excessive rise of the speed N of the second electric motor M2 in the positive or forward direction.

Figure 11:
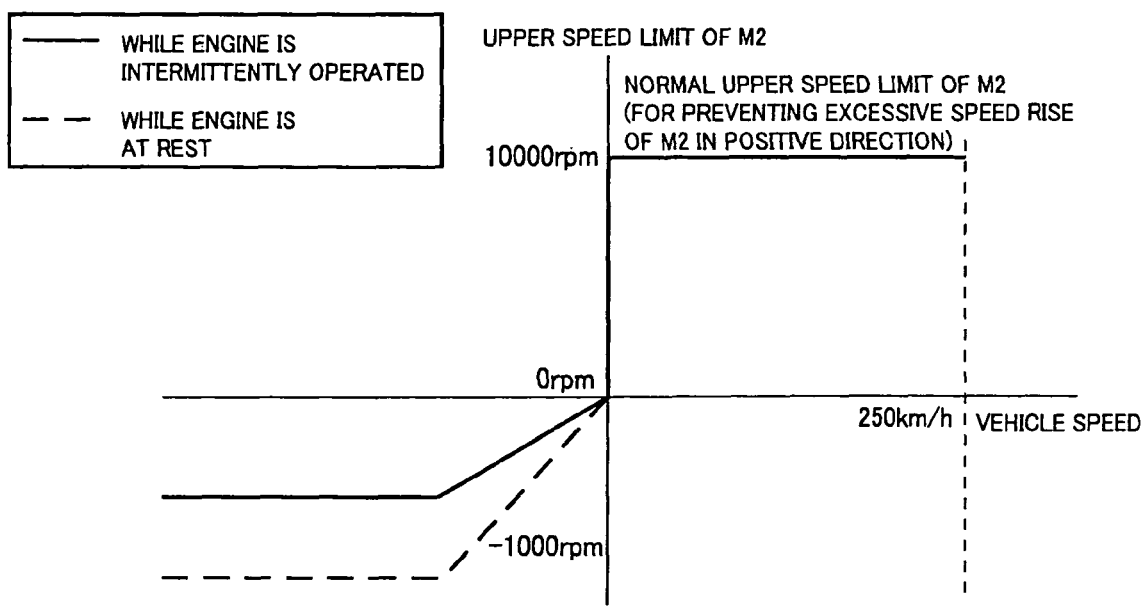
FIG. 11 is a view showing a map indicative of a relation between the vehicle speed and the upper speed limit and a lower speed limit of the second electric motor while the shift lever is placed in a non-drive or neutral position.

When a negative determination is obtained in step S1, that is, when the drive position determining portion 102 determines that the shift lever 52 is placed in the non-drive or neutral position N, the control flow goes to step S2 also corresponding to the control range determining portion 100, to select or set the narrow control range represented by the map indicated in FIG. 11, for setting the normal upper limit $N_{MAX}$ and the limited lower limit $N_{MIN}$ of the speed NM of the second electric motor M2 (speed $N_{18}$ of the power transmitting member 18), for reducing the amounts of change of the speeds $N_{M2}$, $N_{18}$ and restricting the operation of the engine 8 in the negative or reverse direction.

In the electronic control apparatus 80 according to the present embodiment of the invention, the control range setting portion 100 is provided to set one of the two different control ranges of the rotating speed $N_{18}$ of the power transmitting member 18, when the power transmitting path through the automatic transmission portion 20 is placed in the power transmitting state, and the other control range when the power transmitting path is placed in the power cut-off state. When the power transmitting path is switched from the power cut-off state to the power transmitting state, the rotating speed $N_{18}$ of the power transmitting member 18 is lowered in some running condition of the vehicle, and an inertial torque is generated so as to lower the operating speed $N_E$ of the engine 8. By suitably setting the control range of the speed $N_{18}$ of the power transmitting member 18, that is, by setting the comparatively narrow or limited control range indicated in FIG. 11, the inertial torque generated can be effectively reduced, and a drop of the operating speed $N_E$ of the engine 8 in the negative or reverse direction can be restricted, making it possible to reduce deterioration of the durability of the engine 8 due to its operation in the negative or reverse direction.

The present embodiment is further arranged such that the narrower control range of the rotating speed $N_{18}$ of the power transmitting member 18 is set when the power transmitting path is placed in the power cut-off state, so that the inertial torque generated so as to lower the operating speed of the drive power source when the power transmitting path is switched from the power cut-off state to the power transmitting state can be effectively reduced, and a drop of the operating speed $N_E$ of the engine 8 in the negative or reverse direction can be restricted, making it possible to reduce deterioration of the durability of the engine 8 due to its operation in the negative or reverse direction.

The present embodiment is further arranged such that the control range of the rotating speed $N_{18}$ of the power transmitting member 18 is set according to the running state of the vehicle, for reducing the amount of change of the rotating speed $N_{18}$ which takes place upon switching of the power transmitting path from the power cut-off state to the power transmitting state, so that the inertia torque generated so as to lower the operating speed $N_E$ of the engine 8 when the power transmitting path is switched from the power cut-off state to the power transmitting state can be effectively reduced The transmission mechanism 10 described above is arranged such that the electrically controlled differential portion 11 is operable as a continuously-variable transmission mechanism when operating states of the first electric motor M1 is controlled, so that the vehicle drive torque can be smoothly changed. However, the electrically controlled differential portion 11 can be operated as a step-variable transmission the speed ratio of which is variable in steps, as well as the continuously-variable transmission mechanism the speed ratio of which is continuously variable, so that the overall speed ratio of the vehicular power transmitting system in the form of the transmission mechanism 10 is variable in steps, and the vehicle drive torque can be rapidly changed.

The present embodiment is further arranged such that the control range of the rotating speed $N_{18}$ of the power transmitting member 18 is set or changed according to the presently selected position of the manually operable shift lever 52, so that the inertia torque acting on the engine 8 is reduced, and the deterioration of the durability of the engine 8 due to its operation in the negative direction can be restricted.

Other embodiments of this invention will be described. The same reference signs as used in the first embodiment will be used in the following embodiments to identify the same elements.

Second Embodiment

In the second embodiment, the control range setting portion 100 is configured to select the above-described map for setting the upper and lower speed limits of the operating speed $N_{M2}$ of the second electric motor M2, from two or more maps according to the specific operating state of the engine 8 while the shift lever 52 is placed in the non-drive or neutral position N, that is, while the power transmitting path is placed in the power cut-off state. The operating state of the engine 8 is detected by the above-indicated operating state detecting portion 104 shown in the functional block diagram of FIG. 7. The operating state detecting portion 104 is configured to detect one of different operating states of the engine 8, which is selected by the vehicle operator through a suitable switch such as an engine mode selector switch. The different operating states of the engine 8 may include an intermittent operation mode in which the engine 8 is operated intermittently, and a stopping mode in which the engine 8 is held at rest. According to the selected operating mode of the engine 8, the control range setting portion 100 selects a corresponding one of the different control ranges stored in the memory 86.

Described more specifically, the control range setting portion 100 according to the second embodiment is configured to select one of two different lower speed limit values $N_{MIN}$ of the operating speed $N_{M2}$ of the second electric motor M2, for the vehicle speed V lower than zero (that is, while the vehicle is running backwards), depending upon whether the engine 8 is intermittently operated or held at rest. These two upper speed limit values NMIN are respectively indicated by solid and broken lines in FIG. 11. That is, the absolute value of the lower speed limit value $N_{MIN}$ selected when the engine 8 is held at rest is larger than that when the engine 8 is intermittently operated. Accordingly, the second electric motor M2 is permitted to be operated at a higher speed in the negative or reverse direction when the engine 8 is held at rest, than when the engine 8 is intermittently operated.

While the engine 8 is held at rest, the engine 8 is more likely to be operated in the negative or reverse direction due to the inertia torque which acts on the engine 8 so as to lower its operating speed $N_E$. Therefore, the control range setting portion 100 permits the engine 8 to operate at the comparatively high speed $N_E$ in the reverse direction, for reducing the amount of change of the rotating speed N18 of the power transmitting member 18 upon switching of the power transmitting path from the power cut-off state to the power transmitting state, for reducing the inertia torque acting on the engine 8.

The present second embodiment is arranged such that the control range of the rotating speed $N_{18}$ of the power transmitting member 18 is set according to the operating state of the engine 8, so that the inertia torque acting on the engine 8 can be effectively reduced, making it possible to reduce deterioration of the durability of the engine 8 due to its operation in the negative or reverse direction.

The second embodiment is further arranged such that the control range of the rotating speed $N_{18}$ of the power transmitting member 18 is changed depending upon whether the engine 8 is placed in an operated state or is held at rest, so that the inertia torque acting on the engine 8 can be effectively reduced, making it possible to reduce deterioration of the durability of the engine 8 due to its operation in the negative or reverse direction.

Third Embodiment

In the third embodiment, the control range setting portion 100 is configured to set the above-described map for setting the upper and lower speed limits of the operating speed $N_{M2}$ of the second electric motor M2, according to a difference or control error of the engine speed $N_E$ from a target value $N_E^*$ while the shift lever 52 is placed in the non-drive or neutral position N. The target engine speed $N_E^*$ is calculated by the above-indicated target engine speed calculating portion 108 shown in the functional block diagram of FIG. 7. The target engine speed calculating portion 108 is configured to calculate the target engine speed $N_E^*$ on the basis of the operation amount $A_{CC}$ of the accelerator pedal and the vehicle running speed V, such that the engine 8 is operated with high efficiency and high fuel economy at the target operating speed $N_E^*$. The actual operating speed $N_E$ of the engine 8 is detected by the above-indicated engine speed detecting portion 110 also shown in FIG. 7, on the basis of an output signal of an engine speed sensor (not shown). The control error of the engine speed $N_E$ is a difference between the actual engine speed $N_E$ detected by the engine speed detecting portion 110 and the target value $N_E^*$ calculated by the engine speed calculating portion 108. When the difference is a negative value, the absolute value of the lower speed limit $N_{MIN}$ (negative value) is larger than that when the difference is a positive value.

Figure 13:
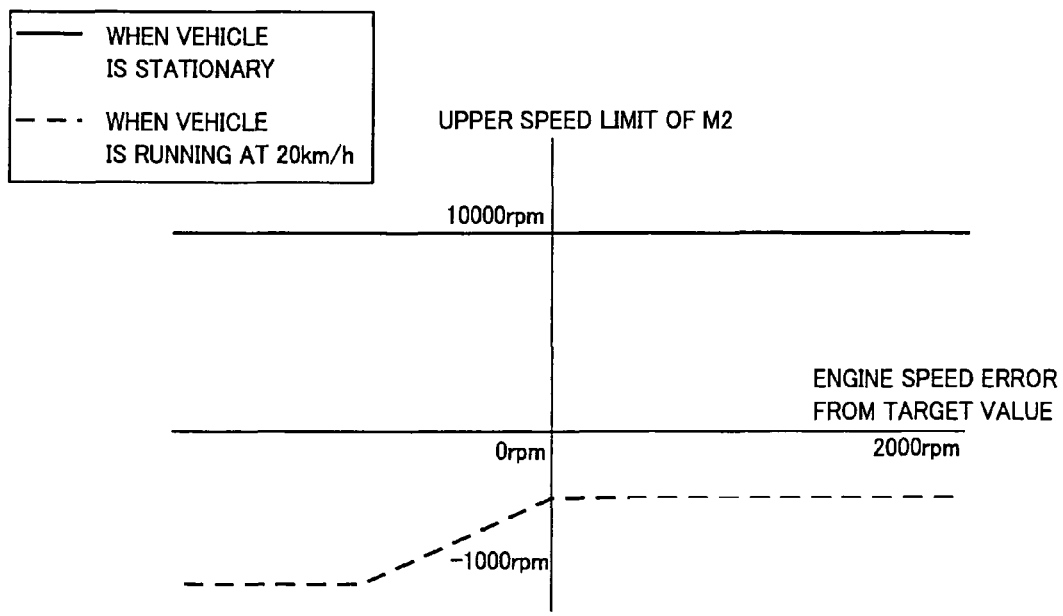
FIG. 13 is a view showing a map indicative of a relation between a control error of an actual engine speed from a target value, and the upper and lower speed limits of the second electric motor while the shift lever is placed in the non-drive or neutral position, the map used in another embodiment of the invention.

A map shown in FIG. 13 indicates a relation between the difference of the actual engine speed from the target value, and the upper and lower speed limits $N_{MAX}$, $N_{MIN}$ of the second electric motor M2 while the shift lever 52 is placed in the non-drive or neutral position N. As indicated by broken line in FIG. 13, the absolute value of the lower speed limit $N_{MIN}$ when the difference is a negative value is larger than that when the difference is a positive value. In other words, the upper limit of the speed $N_{M2}$ of the second electric motor M2 operated in the negative direction is higher when the difference is a negative value than when the difference is a positive value. Further, the absolute value of the lower speed limit $N_{MIN}$ when the difference is negative increases with an increase of the absolute value of the difference (negative value). Accordingly, the amount of change of the operating speed $N_{M2}$ of the second electric motor M2 is reduced upon switching of the power transmitting path from the power cut-off state to the power transmitting state while the difference of the actual engine speed $N_E$ from the target value $N_E^*$ is a negative value, so that the inertia torque acting on the engine 8 so as to lower its speed $N_E$ can be reduced with a decrease of the amount of change of the speed $N_{M2}$, making it possible to reduce deterioration of the durability of the engine 8 due to its operation in the negative or reverse direction. The control range setting portion 100 may be modified to set the control range according to a difference between the actual engine speed $N_E$ when the power transmitting path is placed in the power cut-off state and the actual engine speed $N_E$ when the power transmitting path is placed in the power transmitting state, rather than the above-indicated difference while the shift lever 52 is placed in the non-drive or neutral position N.

The third embodiment described above is arranged such that the control range of the rotating speed $N_{18}$ of the power transmitting member 18 is set according to the difference or control error of the actual operating speed $N_E$ of the engine 8 from the target value $N_E^*$, so that it is possible to reduce the amount of change of the rotating speed $N_{08}$ which would take place due to a variation in the hydraulic pressure applied to the frictional coupling devices for switching the power transmitting path from the power cut-off state to the power transmitting state. Accordingly, the inertia torque acting on the engine 8 can be effectively reduced, making it possible to reduce deterioration of the durability of the engine 8 due to its operation in the negative or reverse direction.

The third embodiment modified as described above is arranged such that the control range of the rotating speed $N_{18}$ of the power transmitting member 18 is set according to the difference between the operating speed $N_E$ of the engine 8 when the power transmitting path is placed in the power cut-off state and the operating speed $N_E$ of the engine 8 when the power transmitting path is placed in the power transmitting state, so that it is possible to reduce the amount of change of the rotating speed $N_{08}$ which would take place due to a variation in the hydraulic pressure applied to the frictional coupling devices for switching the power transmitting path from the power cut-off state to the power transmitting state. Accordingly, the inertia torque acting on the engine 8 can be effectively reduced, making it possible to reduce deterioration of the durability of the engine 8 due to its operation in the negative or reverse direction.

Fourth Embodiment

In the fourth embodiment, the control range setting portion 100 is configured to select the above-described map for setting the upper and lower speed limits of the operating speed $N_{M2}$ of the second electric motor M2, from two or more maps according to the running speed V of the vehicle. The vehicle speed V is detected by the above-indicated vehicle speed detecting portion 106 shown in the functional block diagram of FIG. 7. The vehicle speed detecting portion 106 is configured to detect the rotating speed $N_{OUT}$ of the output shaft 22 of the automatic transmission portion 20, on the basis of an output signal of a speed sensor (not shown). The control range setting portion 100 sets the control range by selecting one of the different maps stored in the memory 86, according to the detected vehicle speed V.

Figures 14, 15:
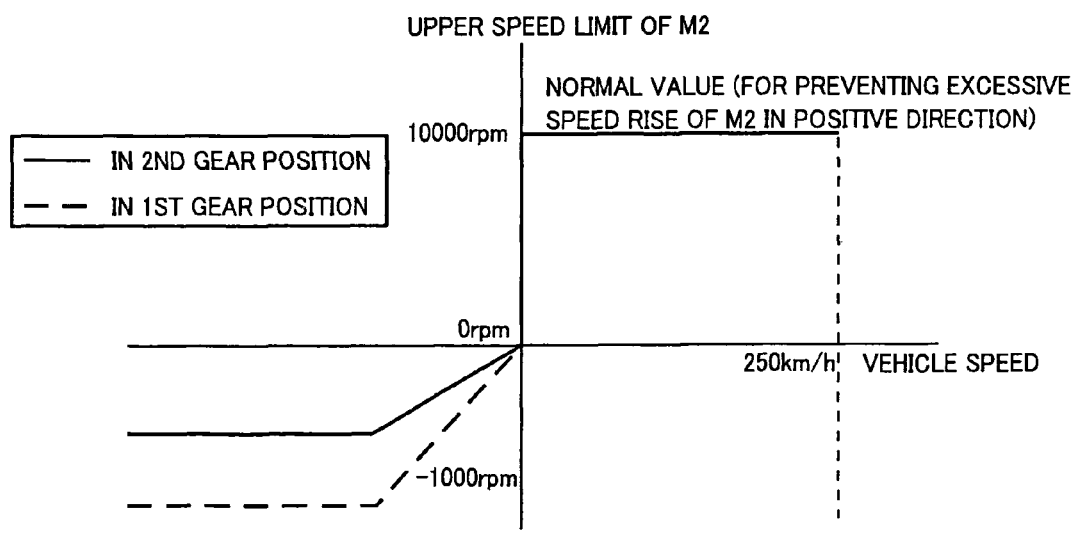
FIG. 14 is a view showing in detail the map indicated by the broken line in FIG. 13, in relation to the control error of the actual engine speed from the target value and the vehicle speed while the shift lever is placed in the non-drive or neutral position.
FIG. 15 is a view showing a map indicative of the relation between the vehicle speed and the upper speed limit of the second electric motor while the shift lever is placed in the neutral position, the map being used in a further embodiment of the invention.

In the map of FIG. 13, the solid line indicates the upper and lower speed limits of the second electric motor M2 when the vehicle is stationary, that is, when the vehicle speed V is zero, and the broken line indicates the upper and lower speed limits when the vehicle is running at the vehicle speed V of −20 km/h, that is when the vehicle is running backwards. As indicated in FIG. 13, the absolute value of the lower speed limit (negative value) of the second electric motor M2 when the vehicle speed V is a negative value (−20 km/h) is larger than that when the vehicle speed V is zero. Accordingly, the amount of change of the operating speed of the second electric motor M2 upon switching of the power transmitting path from the power cut-off state to the power transmitting state can be reduced, and the inertia torque acting on the engine 8 so as to lower its speed $N_E$ is reduced, making it possible to restrict the operation of the engine 8 in the negative or reverse direction. FIG. 14 shows in detail the map indicated by the broken line in FIG. 13. This map indicates the upper and lower speed limits of the second electric motor M2 in relation to the engine speed difference from the target value and the vehicle speed V when the shift lever 52 is placed in the non-drive or neutral position N. As indicated in FIG. 14, the absolute value of the lower speed limit $N_{MIN}$ (negative value) when the vehicle speed V is −50 km/h is larger than that when the vehicle speed V is −20 km/h. The amounts of change of the operating speed of the second electric motor M2 and the rotating speed of the power transmitting member 18 upon switching from the power cut-off state to the power transmitting state increase with an increase of the absolute value of the vehicle speed V (negative value), and the inertia torque acting on the engine 8 and a possibility of its operation in the reverse direction increase with the absolute value of the vehicle speed V. In view of this fact, the absolute value of the lower speed limit (negative value) of the second electric motor M2 is increased with an increase of the vehicle speed V, for reducing the amount of change of the operating speed of the second electric motor M2 when the power transmitting path is switched from the power cut-off state to the power transmitting state, to reduce the inertia torque acting on the engine 8.

The fourth embodiment described above is configured such that the control range of the rotating speed $N_{18}$ of the power transmitting member 18 is set according to the running speed V of the vehicle, so that the inertia torque which increases with an increase of the vehicle running speed V upon switching of the power transmitting path from the power cut-off state to the power transmitting state can be effectively reduced, whereby the operation of the engine 8 in the negative or reverse direction can be restricted, and the deterioration of the drivability of the engine 8 due to its operation in the negative direction can be reduced.

Fifth Embodiment

In the fifth embodiment, the control range setting portion 100 is configured to set the control range of the operating speed of the second electric motor M2 according to the operating state of the engine 8, more specifically, the operating speed $N_E$ of the engine 8. The engine speed $N_E$ is detected by the above-indicated engine speed detecting portion 110. When an inertia torque acting on the engine 8 so as to lower its speed $N_E$ is generated, the engine speed $N_E$ is lowered if the inertia torque is generated while the engine speed $N_E$ is relatively high, or the engine 8 may stall due to the inertia torque if the inertial torque is generated while the engine 8 is in an idling state. When the engine 8 is at rest, the engine 8 may be operated in the reverse direction due to the inertia torque. In view of this fact, the absolute value of the lower speed limit (negative value) of the second electric motor M2 in the neutral or non-drive position of the shift lever 52 is made comparatively large when the engine 8 is operated at a relatively low speed or is held at rest, so that the second electric motor M2 is operated in the reverse or negative direction. The absolute value of the lower speed limit is reduced with a decrease of the engine speed $N_E$. By setting the control range of the operating speed of the second electric motor M2 according to the operating speed $N_E$ of the engine 8 as described above, the inertia torque acting on the engine 8 so as to lower its speed $N_E$ while the engine speed $N_E$ is relatively low or while the engine 8 is at rest can be reduced, so that the operation of the engine 8 in the reverse direction can be restricted. Further, the setting of the speed control range of the second electric motor M2 according to the engine speed $N_E$ makes it possible to reduce the amount of electric energy consumption by the second electric motor M2.

The fifth embodiment is arranged such that the control range of the rotating speed $N_{18}$ of the power transmitting member 18 is set according to the operating speed $N_E$ of the engine 8, so that the inertial torque acting on the engine 8 can be effectively reduced, making it possible to reduce deterioration of the durability of the engine 8 due to its operation in the negative or reverse direction. Further, the setting of the speed control range of the second electric motor M2 according to the engine speed $N_E$ makes it possible to reduce the amount of electric energy consumption by the second electric motor M2.

Sixth Embodiment

In the sixth embodiment, the control range setting portion 100 is configured to set the control range of the rotating speed of the second electric motor M2 according to the speed ratio of a presently selected one of the gear positions of the automatic transmission portion 20. The speed ratio is detected by the above-described speed ratio detecting portion 112 shown in the functional block diagram of FIG. 7. The speed ratio detecting portion 112 is configured to determine the presently established gear position of the automatic transmission portion 20, on the basis of a signal received from the step-variable shifting control portion 82, and to detect the speed ratio of the presently established gear position. The control range setting portion 100 sets the control range of the operating speed of the second electric motor M2, by selecting a map stored in the memory 86, which corresponds to the detected speed ratio.

As indicated in the table of FIG. 2, the speed ratio of the automatic transmission portion 20 increases in the direction from the fourth gear position toward the first gear position. When the automatic transmission portion 20 is switched from the power cut-off state to the power transmitting state while the vehicle is moved down backwards on a downhill roadway with the shift lever 52 placed in the neutral position N, the amount of change of the rotating speed $N_{18}$ of the power transmitting member 18 increases with an increase of the speed ratio of the automatic transmission portion 20, at a given running speed V of the vehicle. In view of this fact, the absolute value of the lower speed limit of the second electric motor M2 increases with an increase of the speed ratio, as indicated by solid and broken lines in FIG. 15, which indicates two different maps indicative of the lower speed limits in relation to the vehicle speed V., which maps correspond to the first and second gear positions, respectively. By setting the control range of the speed of the second electric motor M2 according to a selected one of these maps, the second electric motor M2 is permitted to be operated at a higher speed in the reverse direction when the speed ratio is relatively high, that is, when the first gear position is presently established, than when the second gear position is presently established. Accordingly, the inertia torque generated upon switching of the power transmitting path through the automatic transmission portion 20 from the power cut-off state to the power transmitting state can be effectively reduced, making it possible to restrict the operation of the engine 8 in the negative direction. Thus, the operation of the engine 8 in the negative or reverse direction can be restricted by setting the control range of the rotating speed N18 of the power transmitting member 18 according to the presently selected gear position (speed ratio) of the automatic transmission portion 20.

The sixth embodiment is arranged such that the control range is set according to the presently established speed ratio of the automatic transmission portion 20, so that the inertia torque acting on the engine 8 can be effectively reduced, making it possible to reduce deterioration of the durability of the engine 8 due to its operation in the reverse direction.

While the preferred embodiments of this invention have been described in detail by reference to the accompanying drawings, it is to be understood that the present invention may be otherwise embodied.

In the illustrated embodiments, the control range of the operating speed of the second electric motor M2 is defined by the upper speed limit $N_{MAX}$ (positive value) and the lower speed limit $N_{MIN}$ (negative value). However, only the lower speed limit indicating the permissible highest speed of operation of the second electric motor M2 in the negative or reverse direction may be set upon switching of the power transmitting path from the power cut-off state to the power transmitting state.

While the upper speed limit $N_{MAX}$ of the second electric motor M2 is set to be 1000 rpm in the illustrated embodiments, the upper speed limit may be suitably determined depending upon the capacity of the second electric motor M2.

In the illustrated transmission mechanism 10, the second electric motor M2 is connected directly to the power transmitting member 18. However, the second electric motor M2 may be connected to any portion of the power transmitting path between the differential portion 11 and the drive wheels 34, either directly or indirectly through a suitable transmission device.

Although the differential portion 11 functions as an electrically controlled continuously variable transmission the gear ratio 70 of which is continuously variable from the minimum value $\gamma 0_{min}$ to the maximum value $\gamma 0_{max}$, the differential portion 11 may be modified such that its speed ratio $\gamma 0$ is not variable continuously, but is variable in steps by utilizing its differential function. The present invention is applicable to a hybrid vehicle drive system including the differential portion modified as described above.

Further, the differential portion 11 in the illustrated transmission mechanism 10 may be provided with a differential limiting device which is incorporated in the power distributing mechanism 16 and which is operable as a step-variable transmission having two forward-drive positions by limiting the differential function of the differential portion 11.

In the power distributing mechanism 16 in the illustrated transmission mechanism 10, the first carrier CA1 is fixed to the engine 8, and the first sun gear S1 is fixed to the first electric motor M1 while the first ring gear R1 is fixed to the power distributing member 18. However, this arrangement is not essential. The engine 8, first electric motor M1 and power transmitting member 18 may be fixed to any other elements selected from the three elements CA1, S1 and R1 of the first planetary gear set 24.

While the engine 8 is directly fixed to the input shaft 14 in the illustrated transmission mechanism 10, the engine 8 may be operatively connected to the input shaft 14 through any suitable member such as gears and a belt, and need not be disposed coaxially with the input shaft 14.

In the illustrated transmission mechanism 10, the first and second electric motors M1, M2 are disposed coaxially with the input shaft 14 such that the first electric motor M1 is connected to the first sun gear S1 while the second electric motor M2 is connected to the power transmitting member 18. However, this arrangement is not essential. For instance, the first electric motor M1 may be operatively connected to the first sun gear S1 through gears, a belt or a speed reduction device, while the second electric motor M2 may be connected to the power transmitting member 18.

The hydraulically operated frictional coupling devices such as the first and second clutches C1, C2 in the illustrated transmission mechanism 10 may be replaced by coupling devices of magnetic powder type, electromagnetic type and mechanical type, such as powder clutches, electromagnetic clutches, meshing-type dog clutches. Where the electromagnetic clutches are used, the switching valve devices incorporated in the hydraulic control unit 70 are replaced by a switching device for controlling electric control signals for selectively energizing and de-energizing solenoids of the electromagnetic clutches, for example.

In the illustrated embodiment, the automatic transmission portion 20 is connected in series to the differential portion 11 through the power transmitting member 18. However, the automatic transmission portion 20 may be disposed coaxially with a counter shaft disposed parallel to the input shaft 14. In this case, the differential portion 11 and the automatic transmission portion 20 are connected to each other through a suitable power transmitting member or members in the form of a pair of counter gears, or sprockets and a chain, such that a rotary motion can be transmitted between the differential portion 11 and the automatic transmission portion 20.

Further, the differential mechanism in the form of the power distributing mechanism 16 provided in the illustrated embodiment may be replaced by a differential gear device including a pinion rotated by the engine 8, and a pair of bevel gears which mesh with the pinion and which are operatively connected to the first electric motor M1 and the power transmitting member 18 (second electric motor M2).

While the power distributing mechanism 16 in the illustrated embodiment is constituted by one planetary gear set 24, it may be constituted by two or more planetary gear sets so that the power distributing mechanism 16 is operable as a transmission having three or more gear positions in the non-differential state (fixed-speed-ratio shifting state). The planetary gear sets are not limited to the single-pinion type, and may be of a double-pinion type. Where the power distributing mechanism 16 is constituted by two ore more planetary gear sets, the engine 8, first and second electric motors M1, M2 and power transmitting member 18 are operatively connected to respective rotary elements of the planetary gear sets, and the power distributing mechanism 16 is switched between its step-variable and continuously-variable shifting states, by controlling the clutches C and brakes B connected to the respective rotary elements of the planetary gear sets.

While the engine 8 and the differential portion 11 are connected directly to each other in the illustrated transmission mechanism 10, they may be connected to each other indirectly through a clutch.

In the illustrated transmission mechanism 10, the differential portion 11 and the automatic transmission portion 20 are connected in series to each other. However, the control apparatus according to the present invention is equally applicable to a drive system in which an electrically controlled differential portion and a step-variable transmission portion are not mechanically independent of each other, provided the drive system as a whole has an electric differential function, and a shifting function different from the electric differential function. Further, the electrically controlled differential portion and the step-variable transmission portion may be suitably disposed in a desired order in the drive system.

It is to be understood that the embodiment of the invention has been descried for illustrative purpose only, and that the present invention may be embodied with various changes and modifications which may occur to those skilled in the art.

What is claimed is:

1. A control apparatus for a vehicular power transmitting system including (a) an electrically controlled differential portion which has a differential mechanism and a first electric motor connected to a rotary element of the differential mechanism and which is operable to control a differential state between a rotating speed of its input shaft connected to a drive power source and a rotating speed of its output shaft by controlling an operating state of the first electric motor, and (b) a switching portion operable to switch a power transmitting path for transmitting power from the drive power source, between a power transmitting state and a power cut-off state, said control apparatus comprising:

a control range setting portion configured to set one of two different upper limits of the rotating speed of said output shaft, depending upon whether said power transmitting path is placed in said power transmitting state or said power cut-off state, by said switching portion;

the control range setting portion configured to set a first upper limit of the rotating speed of the output shaft to be set when the power transmitting path is placed in the power cut-off state while a vehicle is moved backwards, the first upper limit being lower than a second upper limit to be set when the power transmitting path is placed in the power transmitting state;

the control range setting portion configured to set the first upper limit of the rotating speed of the output shaft to be set when the power transmitting path is placed in the power cut-off state while the vehicle is moved backwards such that the first upper limit of the rotating speed of the output shaft is a negative rotating speed, for reducing an amount of change of the rotating speed of the output shaft which takes place when the power transmitting path is switched from the power cut-off state to the power transmitting state.

2. The control apparatus according to claim 1, wherein the control range setting portion sets the first upper limit according to the running speed of the vehicle.

3. The control apparatus according to claim 1, wherein the control range setting portion sets the first upper limit according to a difference of an actual operating speed of the drive power source from a target value.

4. The control apparatus according to claim 1, wherein the control range setting portion sets the first upper limit according to a difference between an operating speed of the drive power source when the power transmitting path is placed in the power cut-off state and the operating speed of the drive power source when the power transmitting path is placed in the power transmitting state.

5. The control apparatus according to claim 1, wherein the control range setting portion sets the first upper limit according to a presently selected position of a manually operable shifting member.

6. The control apparatus according to claim 1, wherein the control range setting portion sets the first upper limit according to an operating state of a coupling device of said switching portion.

7. The control apparatus according to claim 1, wherein the control range setting portion is configured to set the first upper limit of the rotating speed of the output shaft according to an operating state of the drive power source.

8. The control apparatus according to claim 7, wherein the control range setting portion changes said first upper limit depending upon whether the drive power source is placed in an operated state or is held at rest.

9. The control apparatus according to claim 7, wherein the operating state of the drive power source is an operating speed of the drive power source.

10. The control apparatus according to claim 1, wherein said power transmitting path is provided between the electrically controlled differential portion and a drive wheel of a vehicle, and includes a step-variable transmission portion provided with said switching portion, and the control range setting portion is configured to set the first upper limit of the rotating speed of the output shaft according to a presently established speed ratio of said step-variable transmission portion.

11. The control apparatus according to claim 1, wherein the electrically controlled differential portion further includes, in addition to said first electric motor, a second electric motor connected to another rotary element of the differential mechanism, and is operable as a continuously-variable transmission mechanism when operating states of the first and second electric motors are controlled.

12. The control apparatus according to claim 1, wherein the differential mechanism is a planetary gear set having three rotary elements consisting of a carrier connected to the input shaft of the electrically controlled differential portion, a sun gear connected to the first electric motor, and a ring gear connected to the output shaft of the electrically controlled differential portion.

13. The control apparatus according to claim 1, wherein the step-variable transmission portion is an automatic transmission.

14. A control apparatus for a vehicular power transmitting system including (a) an electrically controlled differential portion which has a differential mechanism and a first electric motor connected to a rotary element of the differential mechanism and which is operable to control a differential state between a rotating speed of its input shaft connected to a drive power source and a rotating speed of its output shaft by controlling an operating state of the first electric motor, and (b) a switching portion operable to switch a power transmitting path for transmitting power from the drive power source, between a power transmitting state and a power cut-off state, said control apparatus comprising:

a control range setting portion configured to set an upper limit of the rotating speed of said output shaft according to a running state of a vehicle provided with the vehicular power transmitting system, for reducing an amount of change of the rotating speed of the output shaft which takes place when said power transmitting path is switched by the switching portion from the power cut-off state to the power transmitting state;

the control range setting portion configured to set the upper limit of the rotating speed of the output shaft to be set when the power transmitting path is placed in the power cut-off state while the vehicle is moved backwards such that the upper limit of the rotating speed of the output shaft is a negative rotating speed, for reducing the amount of change of the rotating speed of the output shaft which takes place when the power transmitting path is switched from the power cut-off state to the power transmitting state.

15. The control apparatus according to claim 14, wherein the running state of the vehicle is a running speed of the vehicle, and the control range setting portion sets the upper limit according to the running speed of the vehicle.

16. The control apparatus according to claim 14, wherein the running state of the vehicle is a difference of an actual operating speed of the drive power source from a target value, and the control range setting portion sets the upper limit according to the difference.

17. The control apparatus according to claim 14, wherein the running state of the vehicle is a difference between an operating speed of the drive power source when the power transmitting path is placed in the power cut-off state and the operating speed of the drive power source when the power transmitting path is placed in the power transmitting state, and the control range setting portion sets the upper limit according to the difference.

18. The control apparatus according to claim 14, wherein the running state of the vehicle is a presently selected position of a manually operable shifting member, and the control range setting portion sets the upper limit according to the presently selected position of the manually operable shifting member.

19. The control apparatus according to claim 14, wherein the running state of the vehicle is an operating state of a coupling device of said switching portion, and the control range setting portion sets the upper limit according to the operating state of the coupling device.

20. The control apparatus according to claim 14, wherein the control range setting portion is configured to set the upper limit of the rotating speed of the output shaft according to an operating state of the drive power source.

21. The control apparatus according to claim 20, wherein the control range setting portion changes said upper limit depending upon whether the drive power source is placed in an operated state or is held at rest.

22. The control apparatus according to claim 20, wherein the operating state of the drive power source is an operating speed of the drive power source.

23. The control apparatus according to claim 14, wherein said power transmitting path is provided between the electrically controlled differential portion and a drive wheel of a vehicle, and includes a step-variable transmission portion provided with said switching portion, and the control range setting portion is configured to set the upper limit of the rotating speed of the output shaft according to a presently established speed ratio of said step-variable transmission portion.

24. The control apparatus according to claim 14, wherein the electrically controlled differential portion further includes, in addition to said first electric motor, a second electric motor connected to another rotary element of the differential mechanism, and is operable as a continuously-variable transmission mechanism when operating states of the first and second electric motors are controlled.

25. The control apparatus according to claim 14, wherein the differential mechanism is a planetary gear set having three rotary elements consisting of a carrier connected to the input shaft of the electrically controlled differential portion, a sun gear connected to the first electric motor, and a ring gear connected to the output shaft of the electrically controlled differential portion.

26. The control apparatus according to claim 23, wherein the step-variable transmission portion is an automatic transmission.

* * * * *